United States Patent
Fujiwara et al.

(10) Patent No.: US 8,408,816 B2
(45) Date of Patent: Apr. 2, 2013

(54) OPTICAL CONNECTOR

(75) Inventors: Kunihiko Fujiwara, Sakura (JP); Akito Nishimura, Sakura (JP); Yukio Hayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 89 days.

(21) Appl. No.: 12/727,075

(22) Filed: Mar. 18, 2010

(65) Prior Publication Data
US 2011/0229092 A1    Sep. 22, 2011

(51) Int. Cl.
G02B 6/36    (2006.01)
(52) U.S. Cl. .......................................... 385/88
(58) Field of Classification Search .................. None
See application file for complete search history.

(56) References Cited

U.S. PATENT DOCUMENTS

| 7,473,038 | B2 * | 1/2009 | Fujiwara et al. | 385/88 |
| 2008/0044143 | A1 * | 2/2008 | Wang et al. | 385/92 |

FOREIGN PATENT DOCUMENTS

| JP | 63058408 A | 3/1988 |
| JP | 6-94943 A | 4/1994 |
| JP | 2000-505208 A | 4/2000 |
| JP | 2002-544558 A | 12/2002 |
| JP | 2005-49389 A | 2/2005 |
| JP | 2006-184680 A | 7/2006 |
| JP | 2007-033491 A | 2/2007 |
| WO | WO 97/34179 A1 | 9/1997 |
| WO | WO 00/70381 A1 | 11/2000 |

OTHER PUBLICATIONS

Communication dated Nov. 15, 2011, issued by the Japanese Patent Office in corresponding Japanese Patent Application No. 2007-227259.
Communication dated Nov. 15, 2011, issued by the Japanese Patent Office in corresponding Japanese Patent Application No. 2007-227260.

* cited by examiner

*Primary Examiner* — Sarah Hahm
(74) *Attorney, Agent, or Firm* — Sughrue Mion, PLLC

(57) ABSTRACT

An optical connector, assembled to a front end of an optical fiber and attached to an optical component that is provided with an optical element having an optical axis different from that of the optical fiber, includes a main body having a connection end surface, and a reflective portion changing an angle of an optical path. At least one of a fitting protruding portion and a fitting recessed portion are provided so as to be capable of positioning the optical connector to the optical component by respectively fitting a fitted protruding portion and a fitted recessed portion provided on the optical component in each of a first region on the front end side and a second region on the opposite side thereto with the optical path interposed therebetween.

9 Claims, 34 Drawing Sheets

OPTICAL CONNECTOR

BACKGROUND OF THE INVENTION

1. Field of the Invention

The present invention relates to an optical connector, and more particularly, to an optical connector having a positioning device which positions the optical connector to a counterpart optical component.

2. Description of the Related Art

As a positioning device which positions an optical connector to a predetermined position on an optical component such as an substrate with an optical element in mounting the optical connector to the optical component, there is a fitting positioning method.

The fitting positioning method is a method of positioning an optical connector with respect to an optical component by providing a fitting position configured as a recessed portion or a protruding portion in the optical connector and fitting the fitting portion to a fitted portion configured as a recessed portion or a protruding portion provided in the optical component.

The optical connector employing the fitting positioning method requires high precision in positioning the optical connector with respect to the optical component.

The present invention has been made in view of the above situation, an object of which is to provide an optical connector capable of ensuring high positioning precision using a positioning device which positions the optical connector to a counterpart optical component.

SUMMARY OF THE INVENTION

An optical connector according to a first aspect of the present invention is assembled to a front end of an optical fiber and is attached to an optical component provided with an optical element having an optical axis direction different from that of the optical fiber so as to optically connect the optical fiber and the optical element, the optical connector including: an optical connector main body which includes a connection end surface facing the optical component, and a reflective portion directing an optical path from the optical fiber to the optical element or directing an optical path from the optical element to the optical fiber, wherein at least one of a fitting protruding portion and a fitting recessed portion are provided so as to be capable of positioning the optical connector to the optical component by respectively fitting a fitted protruding portion and a fitted recessed portion provided on the optical component in each of a first region on the front end side of the optical fiber and a second region on an opposite side thereto with the optical path interposed therebetween, on the connection end surface of the optical connector main body.

In an optical connector according to a second aspect of the present invention, the optical fiber is inserted into a hollow portion provided in the optical main body so as to be fixed, and only the fitting protruding portion is provided in a region which is a projection of the hollow portion onto on the second region of the connection end surface.

In an optical connector according to a third aspect of the present invention, a circular fitting protruding portion that is circular in a plan view or a circular recessed portion that is circular in a plan view is provided in one of the first and second regions on the connection end surface, and a side surface fitting recessed portion or a side surface fitting protruding portion having a side surface that comes in contact with the at least one of a fitted protruding portion and a fitted recessed portion of the optical component and follows the pitch direction of the circular fitting protruding portion or the circular fitting recessed portion is provided in the other of the first and second regions on the connection end surface.

In the optical connector according to the third aspect of the present invention, positioning of the optical connector to the counterpart optical component is performed at two positioning points including a positioning point implemented by the one fitting portion (fitting protruding portion or fitting recessed portion) that is circular in the plan view and a positioning point implemented by the other fitting portion (fitting protruding portion or fitting recessed portion), the side surface of which follow the pitch direction.

At the positioning point implemented by the one circular fitting portion, the clearance between the fitting two members (the fitting portion and the fitted portion) is extremely small, and the positioning can be achieved with good precision at the positioning point (one spot).

With only the positioning point, the optical connector may be rotated around the fitting portion. However, at the positioning point implemented by the other fitting portion, rotation of the optical connector is restricted, and positioning in the rotational direction is achieved. That is, by the positioning of the circular fitting portion at the one spot and the positioning of the fitting portion of which the side surfaces are planar along the pitch direction in the rotational direction, positioning of the optical connector to the counterpart optical component can be made with good precision.

With regard to the fitting of the other fitting portion and the fitted portion of the optical component, the clearance between the fitting portion and the fitted portion is set to be sufficiently small only for the side surface restricting the rotation of the optical connector, and the clearance in the pitch direction of the one fitting portion is set to be sufficiently large, so that problems with fitting between the other fitting portion and the fitted portion of the optical component do not occur.

That is, with regard to the other fitting portion, the part that requires high molding precision to ensure optical precision is only the side surface. The other surfaces of the other fitting portion do not contribute to ensuring optical precision, and thus high precision molding is not needed.

As described above, in the other fitting portion, a part that requires high molding precision to ensure optical precision is only a part of surfaces. For example, in the case where the other fitting portion is a protruding portion that is rectangular in the plan view, only two surfaces from among four surfaces thereof require high molding precision.

In addition, since the side surfaces are planar, it is easy to ensure molding precision.

Therefore, unlike an existing structure in which positioning is performed by fitting of the fitting pins and pin holes at two points and thus there is a problem in that the fitting pin may not be inserted into the pin hole of a counterpart optical component if the precision of the pitch between the two pin holes is low, it is easy to ensure the positioning precision.

During the molding of the optical connector, when the two fitting portions are all circular in the plan view, setting diameters and positions thereof to achieve high precision is not easy and necessitates expensive producing costs. However, when one of the two fitting portions has a shape with the side surface (for example, is rectangular in the plan view), problems with the pitch precision between the two fitting portions are decreased, and molding becomes easy, thereby reducing the producing cost of the optical connector.

In an optical connector according to a fourth aspect of the present invention, only one of the side surface fitting recessed portion and the side surface protruding portion is provided in the other of the first and second regions on the connection end surface, and both opposed side surfaces of the only one of the side surface fitting recessed portion and the side surface protruding portion follow the pitch direction.

In an optical connector according to a fifth aspect of the present invention, two of the side surface fitting recessed portion and the side surface protruding portion are provided in the other of the first and second regions of the connection end surface, and both opposed side surfaces of each of the two of the side surface fitting recessed portion and the side surface protruding portion follow the pitch direction.

The optical connector is suitable for a case where forming a recessed portion in the counterpart optical component is not preferable because if a side surface fitting recessed portion is provided on the other region, the fitted portion corresponding to the side surface fitting recessed portion should be a protruding portion.

For example, when a wiring pattern is formed in the counterpart optical component, in a case where a wiring region is narrowed due to the recessed point, it is possible to avoid narrowing of the wiring region.

In an optical connector according to a sixth aspect of the present invention, the optical component is a substrate provided with the optical element.

In addition, the optical component may be an optical connector.

DETAILED DESCRIPTION OF THE INVENTION

Hereinafter, an optical connector according to the present invention will be described with reference to the accompanying drawings.

Example 1

Figure 7:
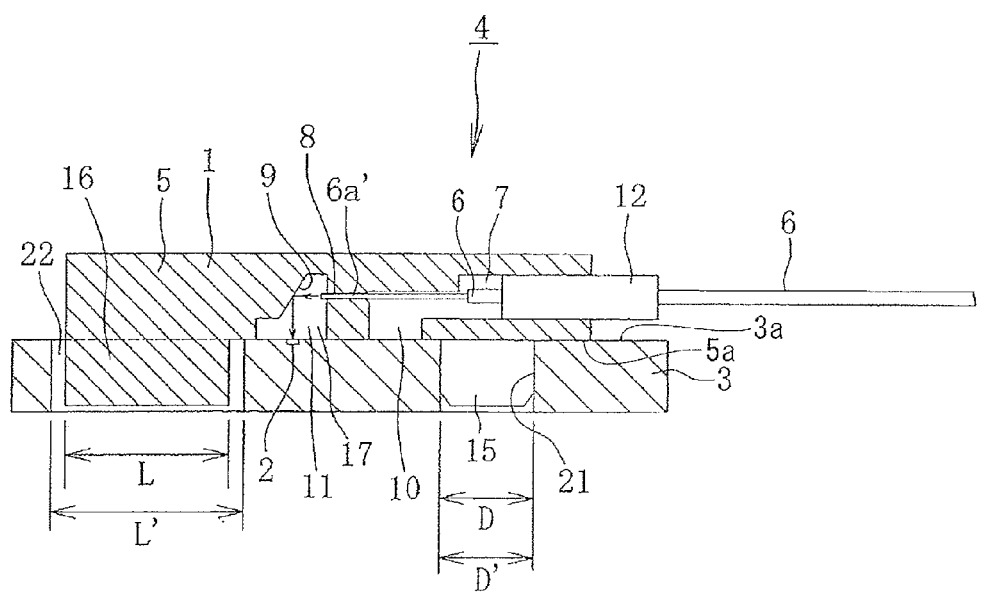
FIG. 7 is a cross-sectional view illustrating the state where the optical connector is mounted on the substrate (cross-sectional view taken along the line B-B of FIG. 6).

FIGS. 1 to 8 illustrate an optical connector 1 according to an example of the present invention. The optical connector 1 is, as illustrated in FIG. 7, an optical connector which can be assembled to the front end of an optical fiber ribbon 6 and is attached to substrate 3 (optical component) provided with at least one optical element 2 for configuring an optical module 4. The optical connector 1 is opposed and attached to the substrate 3 by being optically positioned with respect to the optical element 2.

Hereinafter, in FIG. 2, the left direction is referred to as the forward direction, and the right direction is referred to as the rearward direction. The forward and rearward directions are aligned with the optical axis direction of the front end of the optical fiber ribbon 6.

The optical connector 1 is an optical path conversion-type optical connector for converting an optical path that is parallel to the substrate 3 into a perpendicular path toward a substrate surface and has an optical connector main body 5.

The optical element 2 has an optical axis perpendicular to the optical axis direction of the optical fiber ribbon 6 (the optical axis direction of the front end of the optical fiber ribbon 6).

The optical connector main body 5 has a hollow portion 7 for optical fiber ribbon insertion, into which the optical fiber ribbon 6 that is being introduced parallel to the substrate 3 is inserted.

The hollow portion 7 has an opening portion through which the optical fiber ribbon 6 is inserted on its side portion.

The front side of the hollow portion 7 (a left side of the paper surface in FIGS. 5 and 7) is provided with an optical fiber hole 8 formed in a transverse row perpendicular to the paper surface.

In front of an outlet of the optical fiber hole 8, a side surface of a recessed point 11 has a reflective surface 9 (reflective portion or optical path converting portion) inclined at 45° with respect to the optical axis direction of an optical fiber.

The reflective surface 9 is formed by metal deposition, metal plating or the like.

In FIG. 7, a bare fiber 6a' formed by removing the covering of the optical fiber 6a constituting the optical fiber ribbon 6 is inserted into the optical fiber hole 8, the optical fiber ribbon 6 and the bare fiber 6a' are fixed with an adhesive charged through an adhesive insertion window 10.

The tip of the optical fiber ribbon 6 protrudes to a certain extent to the recessed point 11.

The recessed point 11 having the reflective surface 9 is filled with an adhesive that is transparent to the wavelength used, and is sealed with a transparent glass (not shown in the figures).

Reference numeral 12 denotes a rubber boot which protects the base end of the optical fiber ribbon 6.

As a type of the optical fiber used here, a standard SM-type optical fiber entirely made of quartz or a GI-type optical fiber may be employed.

Otherwise, an optical fiber having a diameter of 80 μm smaller than a standard diameter of 125 μm may be used. Alternatively, an optical fiber entirely made of plastic may be used.

In the optical connector 1 as a positioning device which positions the optical connector 1 to the optical element 2 on the substrate 3, a circular cross-sectional fitting pin (hereinafter, simply referred to as a fitting pin) 15 (fitting protruding portion) projecting toward the substrate 3 and a rectangular cross-sectional projecting portion 16 (fitting protruding portion) are provided on the opposed surface 5a (connection end surface) of the optical connector 1 opposed to the substrate 3 on both sides interposing an optical input and output portion 17 of the optical connector 1 therebetween.

They are called fitting projecting portions.

It is preferable that the fitting pin 15 be a circular fitting protruding portion that is circular in a plan view and be molded integrally with the optical connector main body 5. That is, it is preferable that the optical connector main body 5 be an integrated resin molded product.

Besides the integrated resin molding of the fitting pin and the optical connector main body, the fitting pin may also be adhered to or implanted into the connection surface of the optical connector main body at a predetermined position as a separate member after molding the optical connector main body using resin.

Figure 1:
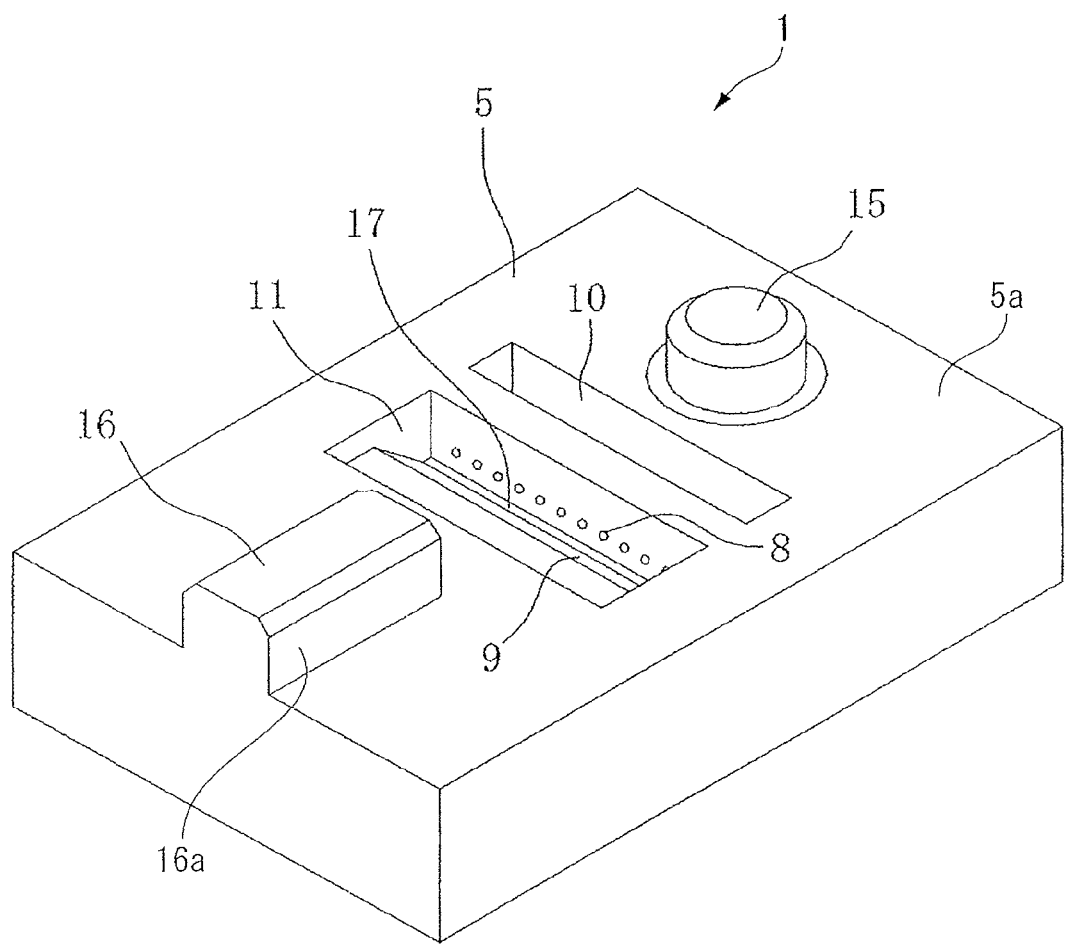
FIG. 1 is a perspective view of an optical connector according to an example of the present invention, the optical connector being positioned to an optical element on a substrate including the optical element and being mounted to the substrate.
Figure 2:
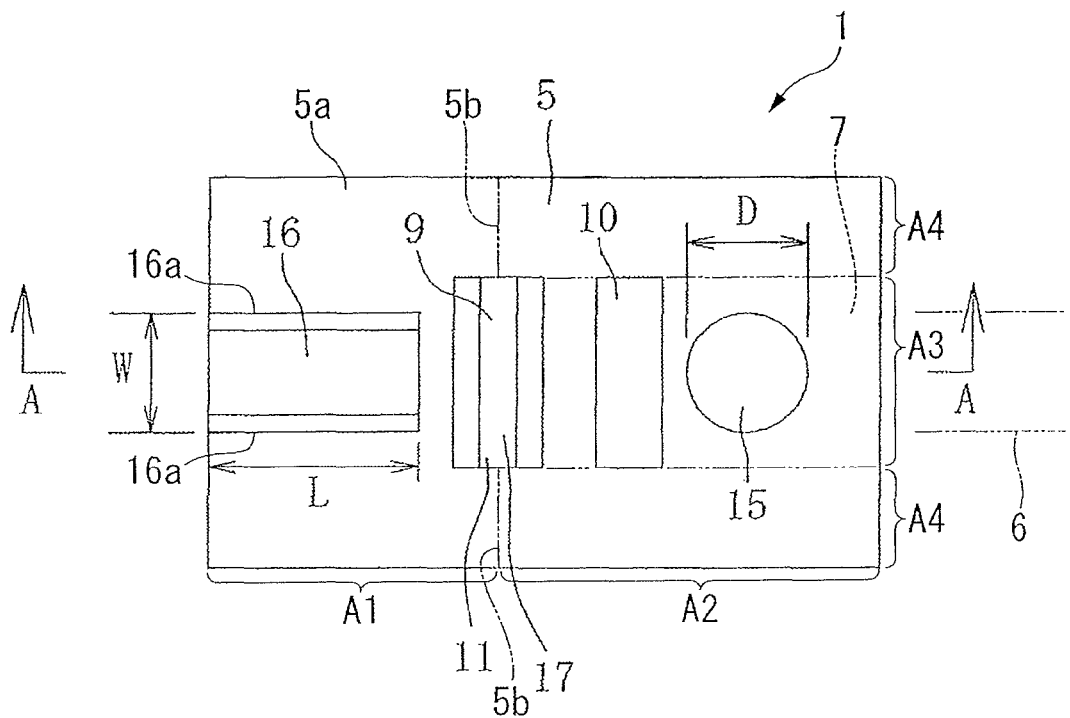
FIG. 2 is a plan view of the optical connector illustrated in FIG. 1.
Figure 3:
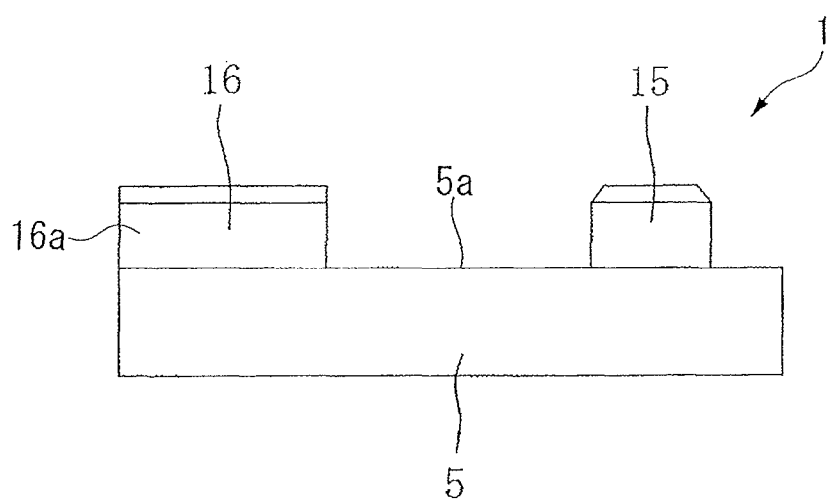
FIG. 3 is a front view of the optical connector illustrated in FIG. 1.
Figure 4:
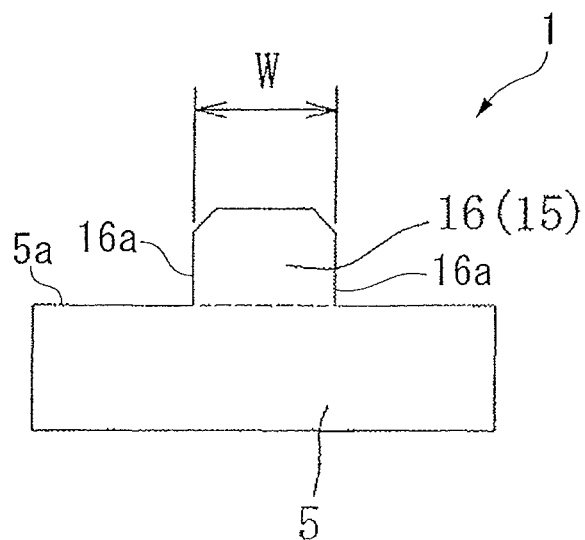
FIG. 4 is a left side view of the optical connector illustrated in FIG. 1.

The outer diameter of the fitting pin 15 is denoted by D, and the width and length of a cross-section of the rectangular cross-sectional projecting portion 16 are denoted by W and L, respectively (FIG. 2 and the like).

The rectangular cross-sectional projecting portion 16 is a side surface fitting protruding portion that is rectangular in the plan view, and side surfaces 16a and 16a thereof in the width direction follow a pitch direction of the fitting pin 15 and the rectangular cross-sectional projecting portion 16.

The pitch direction is a direction along a line connecting a fitting portion (fitting protruding portion or fitting recessed portion) in a first region (as described below) and a fitting portion (fitting protruding portion or fitting recessed portion) in a second region (as described below). In the example, the pitch direction is a direction along a line connecting the fitting pin 15 and the rectangular cross-sectional projecting portion 16. In the example illustrated in FIG. 2, the pitch direction is a direction along a line connecting the rectangular cross-sectional projecting portion 16 and the fitting pin 15, that is, a left and right direction in FIG. 2.

The side surfaces 16a and 16a are opposed to inner side surfaces 22a and 22a of a rectangular cross-sectional groove 22 (fitted recessed portion) of the substrate 3 described later (see FIG. 8) in a width direction thereof.

The side surfaces 16a and 16a of the rectangular cross-sectional projecting portion 16 in the illustrated example are planar along the pitch direction except for tapered upper portions thereof. However, the entire surfaces may be planar along the pitch direction.

The optical input and output portion 17 in this example is a portion in which a point of intersection 5c (see FIG. 5) between an optical path from the reflective surface 9 toward the optical element 2 (or from the optical element 2 toward the reflective surface 9) and the surface including the surface 5a (connection end surface) of the optical connector main body 5 are formed, and more specifically, indicates parts of the recessed point 11 having the reflective surface 9.

The both sides interposing the optical input and output portion 17 are both sides (both sides in the left and right direction in FIGS. 2, 3, 5, and 6) along an optical fiber introducing direction.

Specifically, as illustrated in FIG. 2, the surface 5a (connection end surface) of the optical connector main body 5 opposed to the substrate 3 is partitioned into a first region A1 on the front end side of the optical fiber ribbon 6 (on the left in FIG. 2) and a second region A2 on the opposite side to the front end side (on the right in FIG. 2) with the optical path from the optical connector main body 5 to the substrate 3 (from the substrate 3 to the optical connector main body 5) interposed therebetween.

Figure 5:
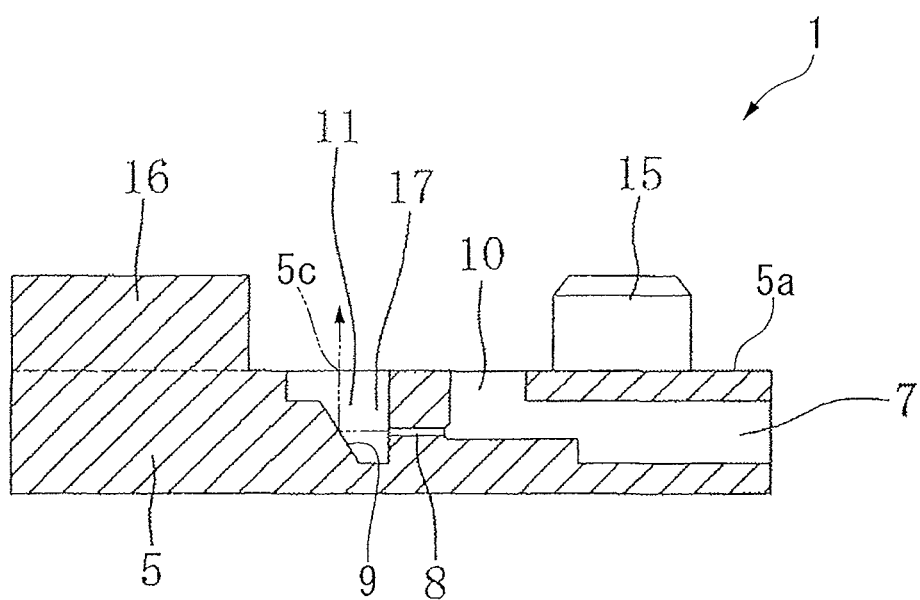
FIG. 5 is a cross-sectional view taken along the line A-A of FIG. 2.
Figure 6:
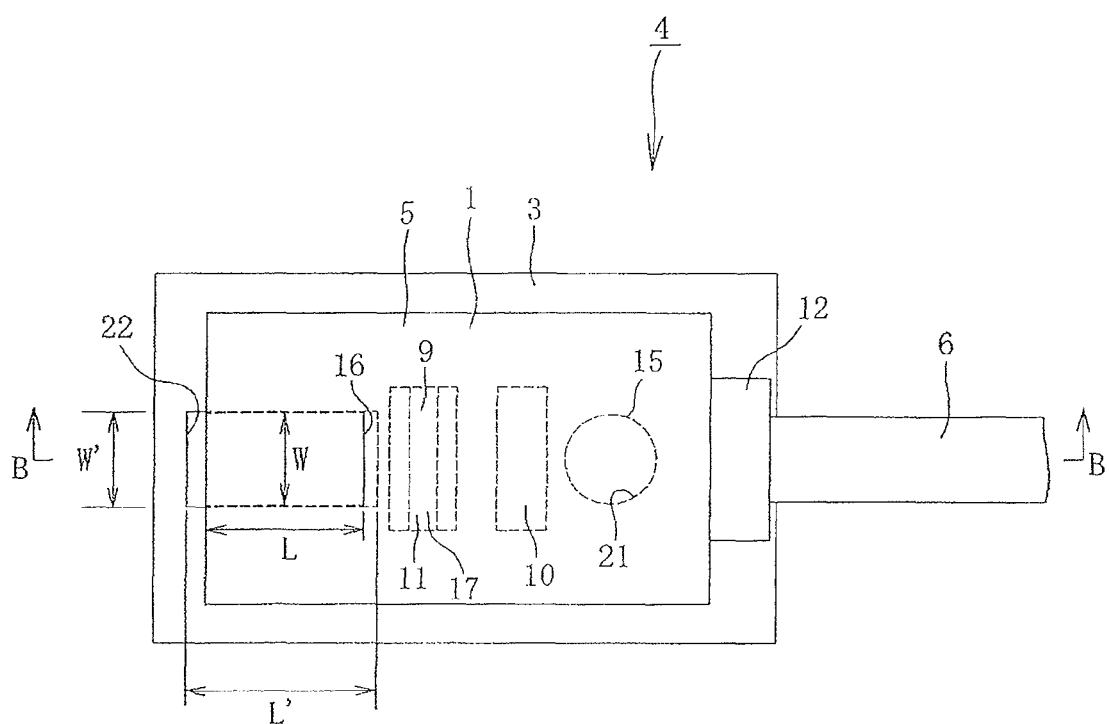
FIG. 6 is a plan view illustrating a state where the optical connector is mounted on the substrate.

As illustrated in FIGS. 2 and 5, a boundary line 5b of the first region A1 and the second region A2 is, for example, a line perpendicular to the optical path (or an optical path from the optical element 2 to the reflective surface 9) from the reflective surface 9 to the optical element 2 and the optical axis direction of the front end of the optical fiber ribbon 6 through the point of intersection 5c (see FIG. 5) between the surface including the surface 5a (the connection end surface) of the optical connector main body 5 and the optical path (see FIG. 2).

As illustrated in FIG. 2, the second region A2 is partitioned into a region which is a perpendicular projection of the hollow portion 7 onto the surface 5a (hereinafter referred to as a hollow region A3) and the remaining region (remaining region A4).

The fitting pin 15 is formed in the second region A2 (specifically, in the hollow region A3), and the rectangular cross-sectional projecting portion 16 is formed in the first region A1.

On the substrate 3 side, a pin hole 21 having a circular shape in the plan view (fitted recessed portion) and a rectangular cross-sectional groove 22 (fitted recessed portion) are provided at positions corresponding to the fitting pin 15 and the rectangular cross-sectional projecting portion 16 of the optical connector 1.

In general, the optical element is not directly disposed on a so-called printed wiring board and is mounted on a module base disposed on the printed wiring board. The substrate 3 of this example corresponds to the module base. It is preferable that the fitted recessed portion be not directly processed on the so-called printed wiring board and be processed on the substrate 3 as in the example, that is, the module base. Here, points where fitted recessed portions are to be formed are not limited to the above.

The precision of an inner diameter D' of the circular pin hole 21 may be set to be substantially the same as the tolerance of a pin hole of a standard MT optical connector having two pin holes.

A diameter of the pin hole is formed at high precision with an extremely small clearance for the outer diameter D of the fitting pin 15 of the optical connector 1.

The precision of a groove width W' of the rectangular cross-sectional groove 22 is set to be a high precision with a sufficiently smaller clearance for a width W of the rectangular cross-sectional projecting portion 16 of the optical connector main body 5. However, a length L' of the rectangular cross-sectional groove 22 is sufficiently greater than a length L of the rectangular cross-sectional projecting portion 16 of the optical connector main body 5 and has a sufficient margin on both sides in the longitudinal direction.

For example, the length L' of the rectangular cross-sectional groove 22 may be greater than the maximum acceptable length L of the rectangular cross-sectional projecting portion 16.

Figure 8:
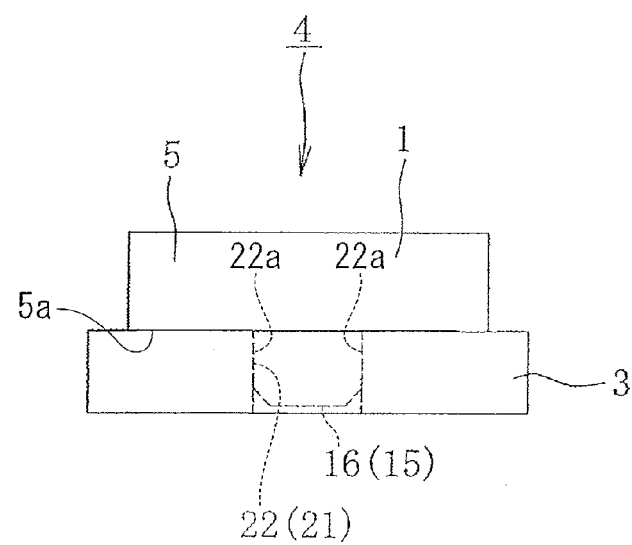
FIG. 8 is a left side view of FIG. 7.

As illustrated in FIG. 8, the inner side surfaces 22a and 22a of the rectangular cross-sectional groove 22 in the width direction are planar and follow the side surfaces 16a and 16a of the rectangular cross-sectional projecting portion 16.

In a case where the substrate 3 is attached to the optical connector 1, the fitting pin 15 of the optical connector 1 is fitted to the pin hole 21 of the substrate 3 and the rectangular cross-sectional projecting portion 16 is fitted to the rectangular cross-sectional groove 22, such that positioning of the optical connector 1 to the optical element 2 on the substrate 3 is performed.

That is, positioning is performed at two positioning points including a positioning point implemented by fitting of the fitting pin 15 and the pin hole 21 and a positioning point implemented by fitting of the rectangular cross-sectional projecting portion 16 and the rectangular cross-sectional groove 22.

At the positioning point implemented by the fitting of the fitting pin 15 and the pin hole 21, the clearance between the fitting two members (the fitting pin 15 and the pin hole 21) is extremely small, and the positioning can be achieved with good precision at the positioning point (one spot). Only with the positioning point, the optical connector may be rotated around the fitting pin. However, at the positioning point implemented by the fitting of the rectangular cross-sectional projecting portion 16 and the rectangular cross-sectional groove 22, rotation of the optical connector is restricted, and positioning in the rotational direction is achieved. That is, by the positioning of the fitting pin 15 at the one spot and the positioning of the rectangular cross-sectional projecting portion 16 in the rotational direction, positioning of the optical connector 1 to the optical element 2 on the substrate 3 can be made with good precision.

In the positioning process, there is no problem in that during the fitting of the fitting pin 15 and the pin hole 21 at the one point, the fitting pin does not fit into the counterpart pin hole.

With regard to the fitting of the rectangular cross-sectional projecting portion 16 and the rectangular cross-sectional groove 22, the clearance between the rectangular cross-sectional projecting portion 16 and the rectangular cross-sectional groove 22 is sufficiently small only for the surface restricting the rotation of the optical element around the fitting pin 15 of the optical connector. That is, the width W of the rectangular cross-sectional projecting portion 16 and the width W' of the rectangular cross-sectional groove 22 are formed at high precision with a sufficiently small clearance. Therefore, the positioning precision of the vicinity of the fitting pin 15 of the optical connector is high, and thus the optical connector 1 is positioned to the optical element 2 on the substrate 3 with good precision.

Furthermore, the length L' of the rectangular cross-sectional groove 22 is sufficiently greater than the length L of the rectangular cross-sectional projecting portion 16 of the optical connector main body 5 and has a sufficient margin on both sides thereof in the longitudinal direction. Therefore, problems with the precision of the distance between the rectangular cross-sectional groove 22 and the pin hole 21 do not occur, and problems in which the rectangular cross-sectional projecting portion 16 cannot be inserted into the rectangular cross-sectional groove 22 do not occur.

Therefore, unlike existing structures in which positioning is performed by fitting of fitting pins and pin holes at two points and thus there is a problem in that the fitting pin may not be inserted into the pin hole of a counterpart optical component if the precision of the pitch between the two pin holes is low, problems in which those to be fitted to each other are not fitted to each other during the positioning process or problems in which positioning precision may be degraded do not occur.

As a material of the optical connector main body 5, a thermoplastic resin such as PPS or an epoxy resin may be suitably used.

As described above, setting diameters and positions of the two pins or the two pin holes to achieve high precision is not easy and necessitates expensive molding costs. However, one of the two fitting portions is implemented by the fitting of the rectangular cross-sectional projecting portion and the rectangular cross-sectional groove, only precision of the two surfaces of the rectangle needs to be ensured. Therefore, problems with pitch precision of hole arrangement do not occur, so that molding can be easily performed at low product cost.

In the optical connector employing the fitting pin positioning method, the tolerance of the diameter of the pin hole is extremely small, and the clearance thereof for the outer diameter of the fitting pin made of SUS is extremely small. Therefore, if mold precision is reduced or manufacturing process is changed in order to reduce manufacturing costs, precision in pitch between the two pin holes on the left and right sides of the optical fiber hole arrangement may be degraded, and the fitting pin may not be easily inserted into the pin hole of the counterpart optical connector. Otherwise, there may be a case where positioning precision of the optical fiber hole is poor although the fitting pin can be connected properly.

There is a need to maintain precision in the diameter and the position of the two pin holes in order to prevent a case where the fitting pin is not inserted into the pin hole of the counterpart optical connector or in order to maintain positioning precision of the optical fiber. As a result, there is a problem in that the manufacturing costs of the optical connector cannot be reduced.

According to the invention, there is provided an optical connector capable of ensuring positioning precision for positioning the optical connector to a desired position without requiring high molding precision.

In addition, contrary to the above-mentioned configuration, a circular cross-sectional pin and a rectangular cross-sectional projecting portion may be formed on a substrate side, and a circular hole to which the circular cross-sectional pin on the substrate side is fitted and a rectangular cross-sectional groove to which the rectangular cross-sectional projecting portion on the substrate side is fitted may be formed on the optical connector side.

In the illustrated example, the optical axis direction of the optical fiber to be assembled to the optical connector is perpendicular to the optical axis direction of the optical element of the substrate. However, the configuration is not limited thereto. As long as the optical axis direction of the optical fiber is different from that of the optical element of the substrate, the optical axis direction of the optical fiber may be inclined with respect to the optical axis direction of the optical element of the substrate at another angle (for example, an angle above 0° and below 180°).

Example 2

Figure 9:
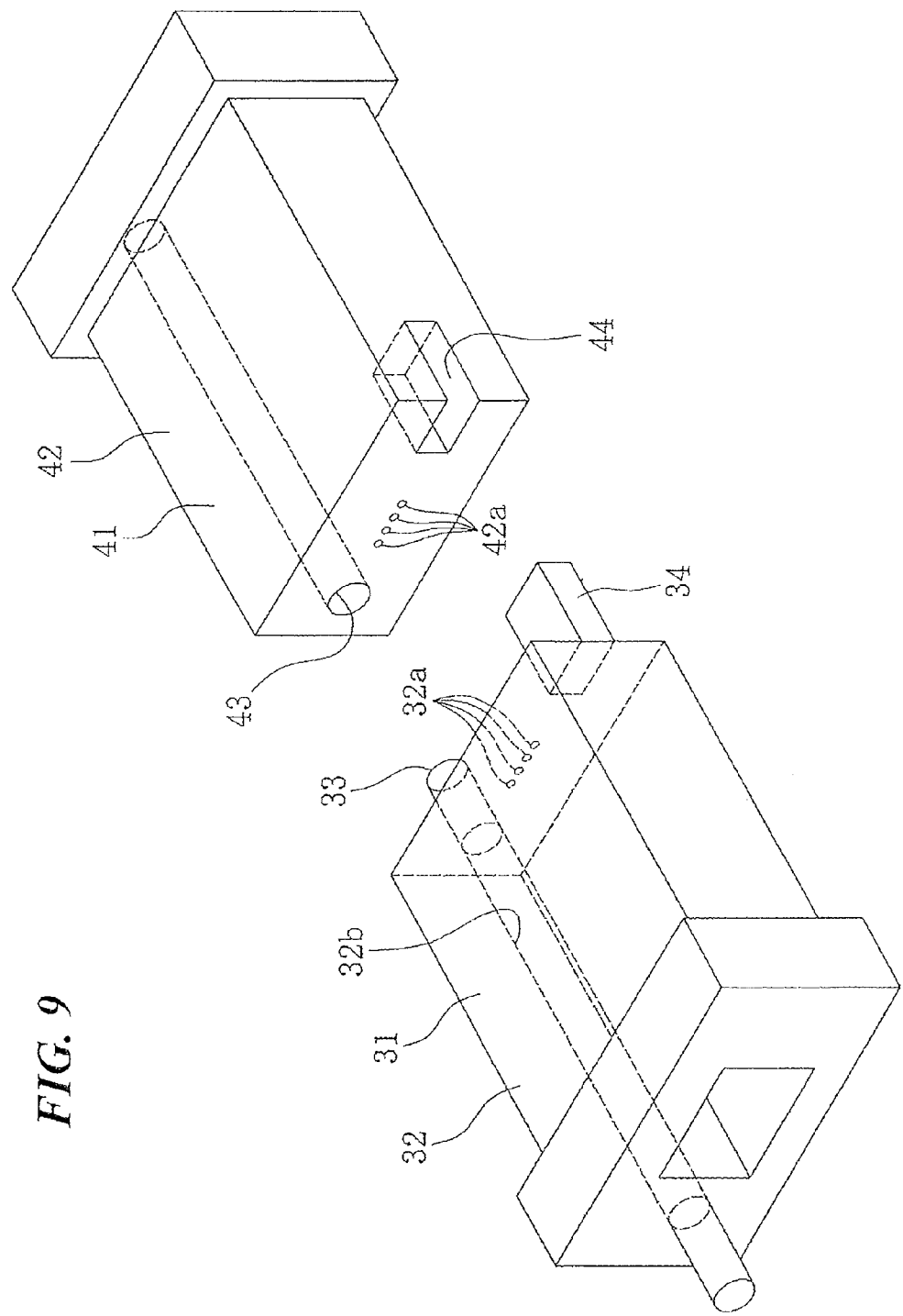
FIG. 9 is a perspective view of an optical connector according to another example of the present invention, the optical connector being used for connection between the optical connectors.

FIG. 9 illustrates an example in which the present invention is applied to an optical connector that is used for connection between optical connectors.

As compared with a so-called MT optical connector having two positioning points implemented by fittings of fitting pins and pin holes, the optical connector in this example has a configuration in which only one positioning point is configured by fitting a fitting pin to a pin hole and the opposite side is configured by fitting of a rectangular cross-sectional projecting portion to a rectangular cross-sectional groove for positioning.

That is, as illustrated in FIG. 9, as a positioning device which positions the other optical connector 41, the one optical connector 31 has a circular cross-sectional fitting pin 33 projecting toward the other optical connector 41 and a rectangular cross-sectional projecting portion 34 on a connection surface in the optical connector main body 32 of the one optical connector 31 to be connected to the other optical connector 41 at both sides in a hole arrangement direction to interpose a row of optical fiber holes 32a of the optical connector main body 32 therebetween. The fitting pin 33 of this example is a separate member from the optical connector main body 32 and is fitted to an empty pin hole 32h of the optical connector main body 32. However, a fitting pin formed integrally with the optical connector main body 32 may be used.

The optical connector main body 42 of the other optical connector 41 is provided with a pin hole 43 to which the fitting pin 33 of the one optical connector 31 is to be fitted, and a rectangular cross-sectional groove 44 to which the rectangular cross-sectional projecting portion 34 of the optical connector main body 32 of the one optical connector 31 is to be fitted. Reference numeral 42a indicates optical fiber holes in the other optical main body 42.

When a pair of the optical connectors 31 and 41 are connected to each other, the fitting pin 33 of the optical connector main body 32 of the one optical connector 31 is fitted to the pin hole 43 of the optical connector main body 42 of the other optical connector 41, and the rectangular cross-sectional projecting portion 34 of the one optical connector main body 32 is fitted to the rectangular cross-sectional groove 44 of the other optical main body 42, thereby positioning the two optical connectors 31 and 41 to each other. That is, positioning is performed at the two points including a positioning point implemented by the fitting of the fitting pin 33 and the pin hole 43 and a positioning point implemented by the fitting of the rectangular cross-sectional projecting portion 34 and the rectangular cross-sectional groove 44.

Therefore, it is possible to obtain the same effect as the effect of the optical connector 1 described with reference to FIGS. 1 to 8. That is, unlike an existing MT optical connector in which positioning is performed by fitting of fitting pins and pin holes at two points and thus there is a problem in that the fitting pin may not be inserted into the pin hole of a counterpart optical component if the precision of the pitch between the two pin holes is low, problems in which those to be fitted to each other are not fitted to each other during the positioning process do not occur.

Example 3

Figure 10:
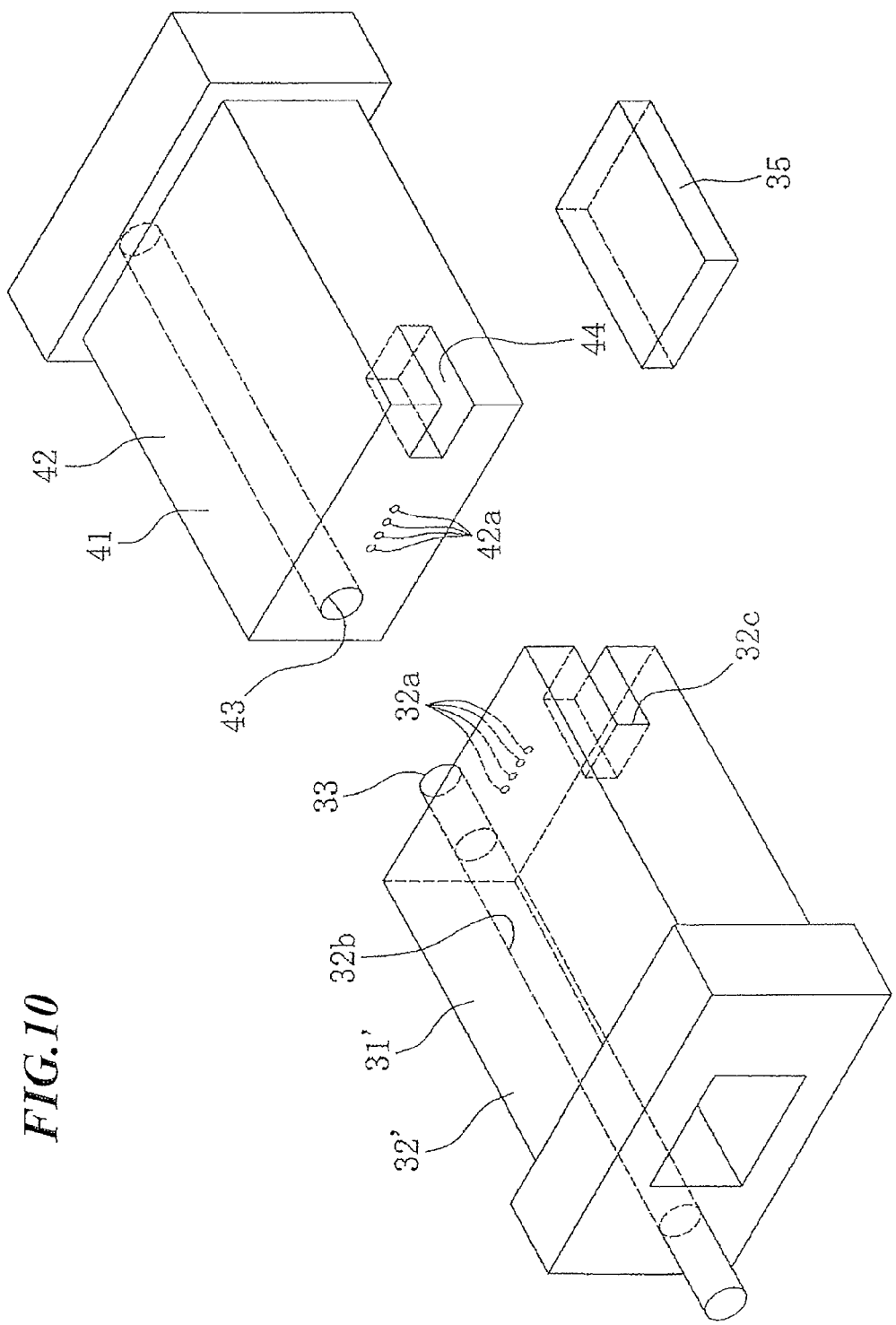
FIG. 10 is a perspective view of an optical connector according to another example, the optical connector being used for connection between the optical connectors.
Figure 11:
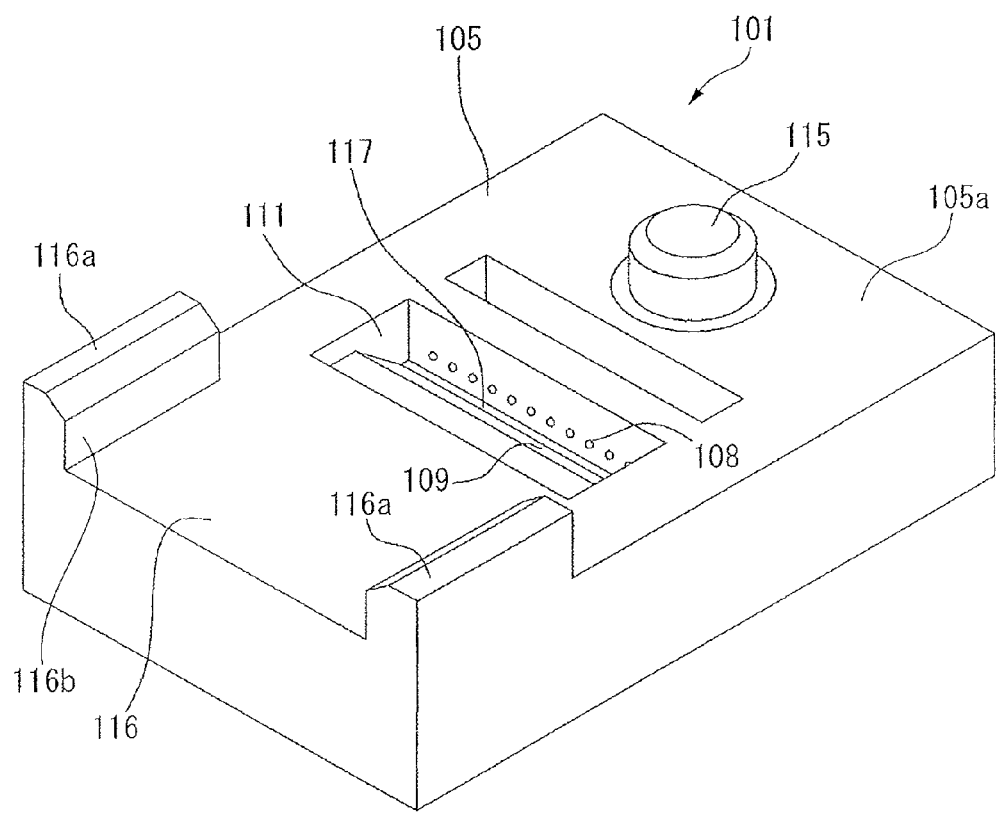
FIG. 11 is a perspective view of an optical connector according to another example of the present invention, the optical connector being positioned to an optical element on an substrate including the optical element and being mounted to the substrate.

FIG. 10 shows an example modified from the example illustrated in FIG. 9. In this example, the rectangular cross-sectional projecting portion 34 formed integrally with the optical connector main body 32 in the one optical connector 31 illustrated in FIG. 9 is configured as a separate member from the optical connector main body. That is, as illustrated in FIG. 10, a rectangular cross-sectional projecting portion 35 is configured as a separate member from the optical connector main body 32' of the one optical connector 31'. When the rectangular cross-sectional projecting portion 35 is fitted to a fitting recessed point 32c provided in the optical connector main body 32', it has the same function as the rectangular cross-sectional projecting portion 34 illustrated in FIG. 9. The fitting recessed point 32c may be set to have the same shape and dimension as well as the precision as those of the rectangular cross-sectional groove 44 provided in the optical connector main body 42 of the other optical connector 41.

Even in this example, as in the example of FIG. 9, the same effect as that of the optical connector 1 illustrated in FIGS. 1 to 8 can be obtained.

In addition, in this example in which the rectangular cross-sectional projecting portion 35 is a separate member from the optical connector main body, the rectangular cross-sectional projecting portion 35 is neither of the two optical connectors 31' and 41 and may be treated as an independent member.

In the examples described above, as an optical component, an optical connector having the same type may be used, or an optical path conversion-type optical connector which is mounted on a substrate may be used.

However, the optical component connected to the optical connector is not limited thereto.

For example, an optical component in which the end surface of an optical waveguide such as an optical fiber is exposed to the end surface connected to the optical connector may be used, and various modifications exist.

Example 4

Figure 15:
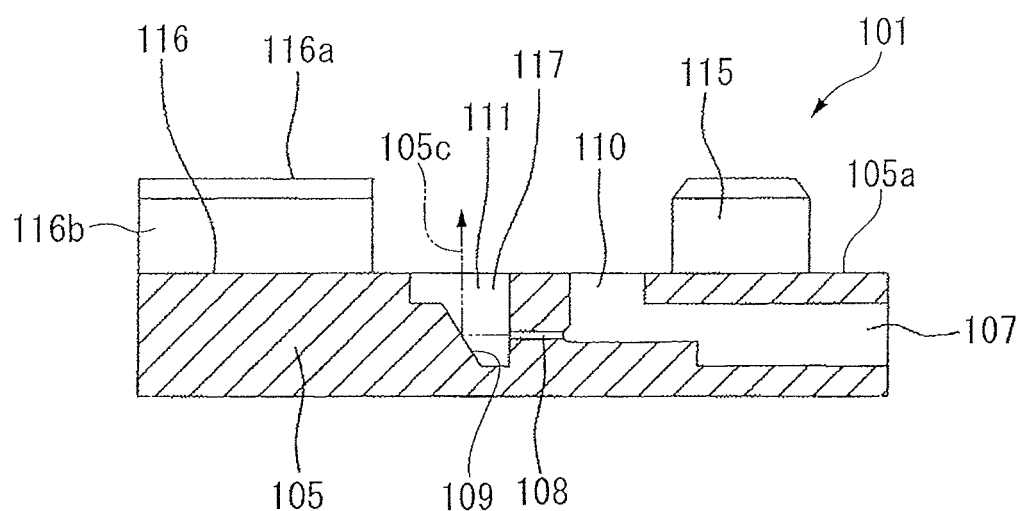
FIG. 15 is a cross-sectional view taken along the line 100A-100A of FIG. 12.
Figure 16:
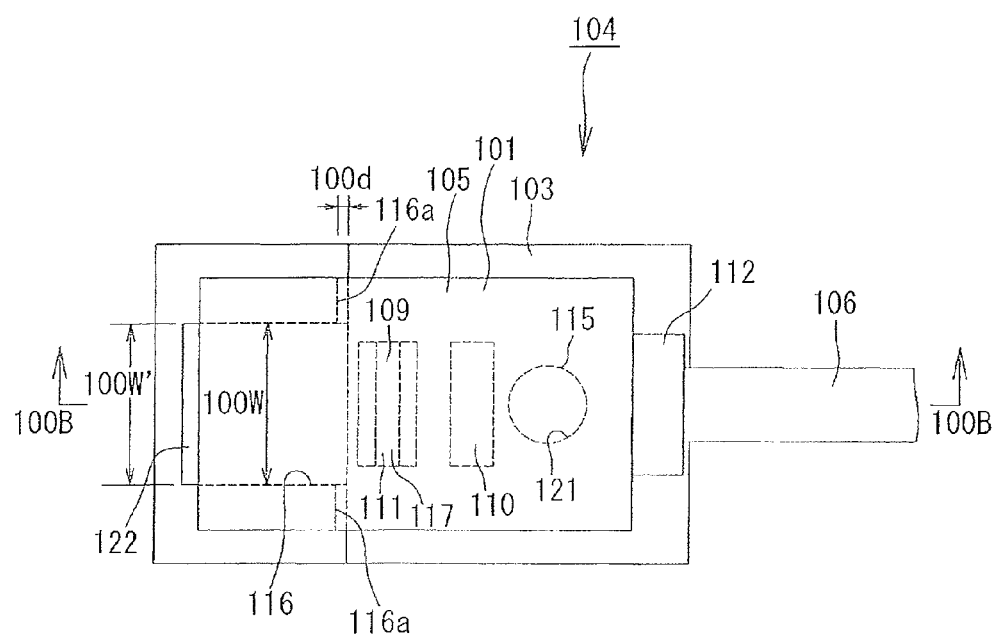
FIG. 16 is a plan view illustrating a state where the optical connector is mounted on the substrate.
Figure 17:
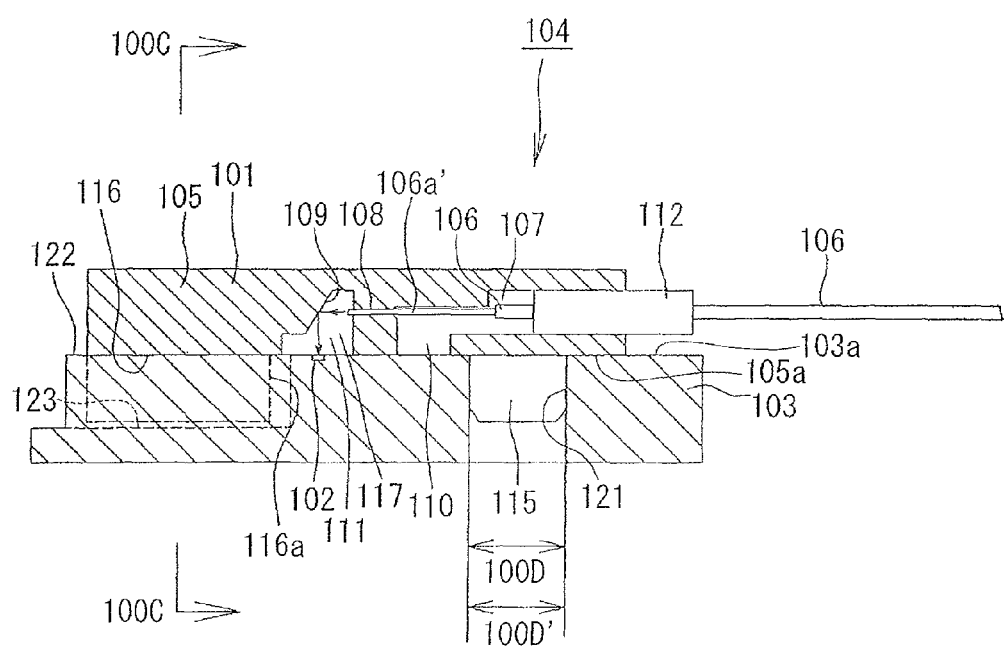
FIG. 17 is a cross-sectional view illustrating the state where the optical connector is mounted on the substrate (cross-sectional view taken along the line 100B-100B of FIG. 16).

FIGS. 11 to 18B illustrate the optical connector 101 according to another example of the present invention. The optical connector 101 is, as illustrated in FIG. 17, an optical connector which can be assembled to the front end of an optical fiber ribbon 106 and is attached to a substrate 103 (optical component) provided with an optical element 102 for configuring an optical module 104. The optical connector 101 is opposed and attached to the substrate 103 by being optically positioned with respect to the optical element 102. In addition, in FIG. 17, the optical element 102 is provided on the substrate 103.

The optical element 102 has an optical axis perpendicular to the optical axis direction of the optical fiber ribbon 6 (the optical axis direction of the front end of the optical fiber ribbon 6). However, the optical axis direction of the optical element 102 is not limited to a direction perpendicular to the optical axis direction of the optical fiber ribbon 6 as long as the optical axis direction of the optical element 102 is different from that of the optical fiber ribbon 6.

In general, the optical element is not directly disposed on a so-called printed wiring board and is mounted on a module base disposed on the printed wiring board. The substrate 103 of this example corresponds to the module base. It is preferable that the fitted recessed portion be riot directly processed on the so-called printed wiring board and be processed on the substrate 103 as in the example, that is, the module base. Here, the points where fitted recessed portions are to be formed are not limited to the above.

The optical connector 101 is an optical path conversion-type optical connector for converting an optical path that is parallel to the substrate 103 into a perpendicular path toward a substrate surface and has an optical connector main body 105.

The optical connector main body 105 has a hollow portion 107 for optical fiber ribbon insertion, into which the optical fiber ribbon 106 that is being introduced parallel to the substrate 103 is inserted.

The hollow portion 107 has an opening portion through which the optical fiber ribbon 106 is inserted on its side portion.

The front side of the hollow portion 107 is provided with a plurality of optical fiber holes 108 formed in a transverse row perpendicular to the paper surface. In front of an outlet of the optical fiber hole 108, an inclined surface of the optical connector main body has a metal reflective surface 109 (reflective portion or optical path converting portion) inclined at 45° with respect to the optical axis direction of an optical fiber. The reflective surface 109 is formed by metal deposition, metal plating or the like.

In FIG. 17, a bare fiber 106a' formed by removing the covering of an optical fiber 106a constituting the optical fiber ribbon 106 is inserted into the optical fiber hole 108, the optical fiber ribbon 106 and the bare fiber 106a' are fixed with an adhesive charged through an adhesive insertion window 110.

The tip of the optical fiber ribbon 106 protrudes to a certain extent to the recessed point 111.

The recessed point 111 having the reflective surface 109 is filled with an adhesive that is transparent to the wavelength used, and is sealed with a transparent glass (not shown in the figures).

Reference numeral 112 denotes a rubber boot which protects the base end of the optical fiber ribbon 106.

As a type of the optical fiber used here, a standard SM-type optical fiber entirely made of quartz or a GI-type optical fiber may be employed.

Otherwise, an optical fiber having a diameter 80 μm smaller than a standard diameter of 125 μm may be used.

Alternatively, an optical fiber entirely made of plastic may be used.

In the optical connector 101, as a positioning device which positions the optical connector 101 to the optical element 102 on the substrate 103, a circular cross-sectional fitting pin (hereinafter, simply referred to as a fitting pin) 115 (fitting protruding portion) projecting toward the substrate 103 and a U-shaped groove 116 are provided in an opposed surface 105a (upper surface in FIG. 11) (connection end surface) of the optical connector 101 opposed to the substrate 103 on both sides interposing an optical input and output portion 117 of the optical connector 101 therebetween. The U-shaped groove 116 in the illustrated example is configured by providing two protrusions 116a (fitting protruding portion) (side surface fitting protruding portion) on the both sides of the optical connector main body 105 to be separated from each other such that an empty space between the two protrusions 116a is formed as the U-shaped groove 116 (that is, a space between inner side surfaces of the protrusions 116a on the both sides is the U-shaped groove 116). Here, the U-shaped groove may be configured as a portion pitted from the opposed surface (the upper surface in FIG. 11) of the optical fiber opposed to the substrate 103.

It is preferable that the circular cross-sectional fitting pin 115 be a circular fitting protruding portion that is circular in plan view, and the circular cross-sectional fitting pin 115 and the protrusions 116a forming the U-shaped groove be molded integrally with the optical connector main body 105 during the molding.

That is, it is preferable that the optical connector be an integrated resin molded product.

Besides the integrated resin molding of the fitting pin and the optical connector main body, the fitting pin may also be adhered to or implanted into a connection surface of the optical connector main body at a predetermined position as a separate member after molding the optical connector main body using resin.

Figure 12:
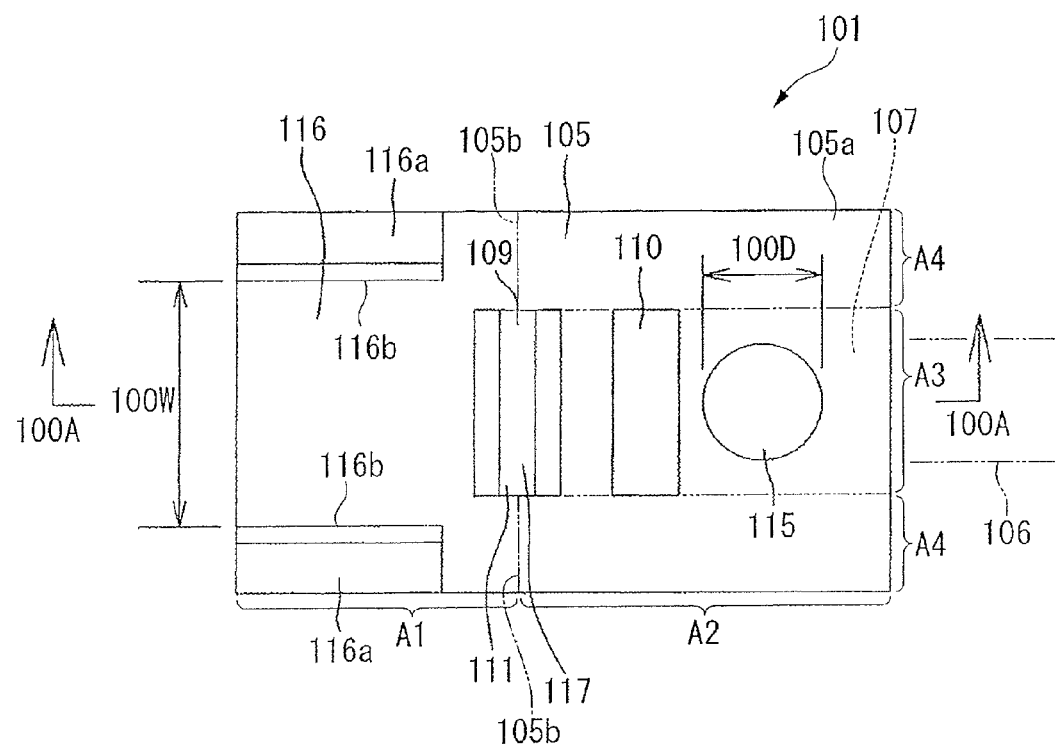
FIG. 12 is a plan view of the optical connector illustrated in FIG. 11.
Figure 13:
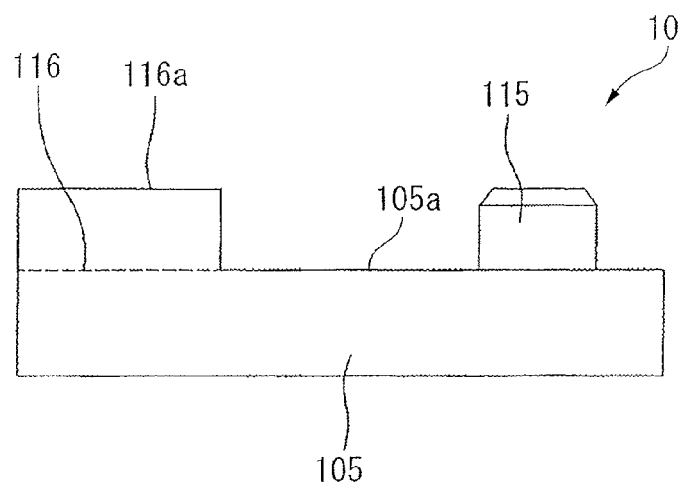
FIG. 13 is a front view of the optical connector illustrated in FIG. 11.
Figure 14:
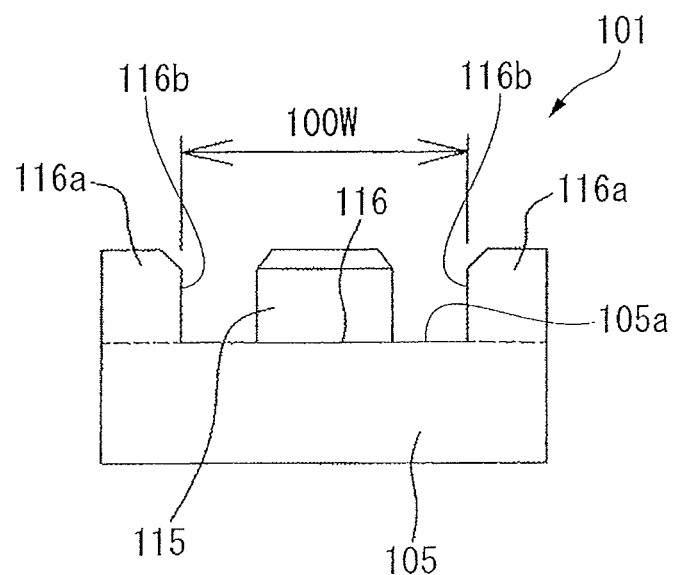
FIG. 14 is a left side view of the optical connector illustrated in FIG. 11.

The outer diameter of the fitting pin 115 is denoted by 100D, and the width of a cross-section of the U-shaped groove 116 is denoted by 100W (FIG. 12 and the like).

The protrusions 116a and 116a are side surface fitting protruding portions that are rectangular in the plan view, and side surfaces 116b and 116b thereof that are opposed to each other in the width direction are planar along a pitch direction of the fitting pin 115 and the protrusions 116a and 116a (left and right direction in FIG. 12). Side surfaces 116b and 116b are opposed to outer side surfaces 122a and 122a of a rectangular cross-sectional protruding portion 122 of the substrate 103 described later.

The pitch direction is a direction along a line connecting a fitting portion (fitting protruding portion or fitting recessed portion) in a first region (as described below) and a fitting portion (fitting protruding portion or fitting recessed portion) in a second region (as described below). When a plurality of fitting portions are provided on one side, the pitch direction may be a direction along a line connecting the average position of the fitting portions on the one side and a fitting portion on the other side, or a direction along a line connecting any of the fitting portions on the one side and the fitting portion on the other side.

In the example illustrated in FIG. 12, since there are two protrusions 116a and 116a, the pitch direction is a direction along the shortest line connecting the fitting pin 115 and an intermediate position between the protrusions 116a and 116a, that is, a left and right direction in FIG. 12.

Alternatively, the pitch direction may be a direction along a line connecting the fitting pin 115 and one of the protrusions 116a and 116a, or a direction along a line connecting the fitting pin 115 and an arbitrary intermediate position between the protrusions 116a and 116a.

Further, when more than three protrusions 116a are provided, it may be arranged such that two of the protrusions 116a and 116a that are most distant from each other in the rotational direction with respect to the fitting pin 115 are specified, and then the pitch direction is designated to a direction along a line connecting the fitting pin 115 and any of the specified two of the protrusions 116a and 116a, or a direction along a line connecting the fitting pin 115 and an intermediate position between the specified two of the protrusions 116a and 116a.

The side surfaces 116b and 116b of the protrusions 116a and 116a of the illustrated example are planar along the pitch direction except for tapered upper portions thereof. However, the entire surfaces may be planar along the pitch direction.

The optical input and output portion 117 is a portion in which a point of intersection between an optical path from the reflective surface 109 toward the optical element 102 (or from the optical element 102 toward the reflective surface 109) and the surface including the connection end surface of the optical connector main body is formed, and more specifically, indicates parts of the recessed point 111 having the reflective surface 109.

The both sides interposing the optical input and output portion 117 are both sides (both sides in the left and right direction in FIGS. 12, 13, 15, and 16) along an optical fiber introducing direction.

In addition, the U-shaped groove is an example of a structure specifying a fitting reception portion that accommodates a rectangular cross-sectional protruding portion on the substrate side described later. A structure of a recessed portion to be fitted to the protruding portion has various modifications, and shapes of both wall portions configuring the groove structure have various modifications, so that the present invention is not limited to the illustrated structure. That is, according to the present invention, a term "U-shaped groove" is used to collectively refer to the various modifications.

As illustrated in FIG. 12, a surface 105a (a connection end surface) of the optical connector main body 105 opposed to the substrate 103 is partitioned into a first region A1 on the front end side of the optical fiber ribbon 106 (on the left in FIG. 12) and a second region A2 on the opposite side to the front end side (on the right in FIG. 12) with the optical path from the optical connector main body 105 to the substrate 103 (from the substrate 103 to the optical connector main body 105) interposed therebetween.

As illustrated in FIGS. 12 and 15, a boundary line 105b of the first region A1 and the second region A2 is, for example, a line perpendicular to the optical path (or an optical path from the optical element 102 to the reflective surface 109) from the reflective surface 109 to the optical element 102 and the optical axis direction of the front end of the optical fiber ribbon 106 through a point of intersection 105c between a surface including the surface 105a (the connection end surface) of the optical connector main body 105 and the optical path (see FIG. 12).

As illustrated in FIG. 12, the second region A2 is partitioned into a region which is a perpendicular projection of the hollow portion 107 onto the surface 105a (hereinafter referred to as a hollow region A3) and the remaining region (remaining region A4).

The fitting pin 115 is formed in the second region A2 (specifically, in the hollow region A3), and the protrusions 116a and 116a and the U-shaped groove 116 are formed in the first region A1.

Figure 18A:
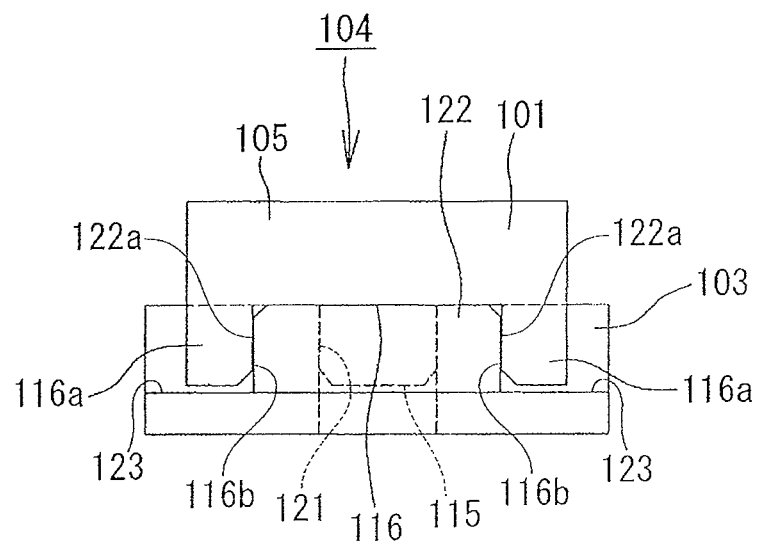
FIG. 18A is a left side view of FIG. 17.
Figure 18B:
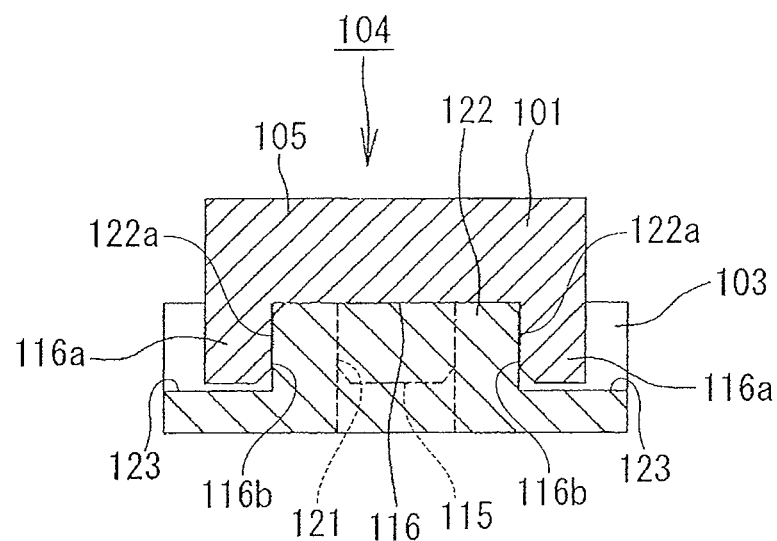
FIG. 18B is a cross-sectional view taken along the line 100C-100C of FIG. 17.

On the substrate 103 side, as shown in FIG. 18A and FIG. 18B, a pin hole 121 (fitted recessed portion) having a circular shape in the plan view and a rectangular cross-sectional protruding portion 122 are provided at positions corresponding to the fitting pin 115 and the U-shaped groove 116 of the optical connector 101.

The rectangular cross-sectional protruding portion 122 is configured by two recessed portions 123 (fitted recessed portion) that are separated from each other, and the outer side surfaces 122a and 122a of the rectangular cross-sectional protruding portion 122 are inner side surfaces of the recessed portion 123.

The precision of an inner diameter 100D' of the circular pin hole 121 may be set to be substantially the same as a tolerance of a pin hole of a standard MT optical connector (or an MT plug) having two pin holes, and the pin hole is formed at a high precision with an extremely small clearance for the outer diameter 100D of the fitting pin 115 on the optical connector 101 side.

The precision of a groove width 100W' of the rectangular cross-sectional protruding portion 122 is set to be a high precision with a sufficiently smaller clearance for a width 100W of the U-shaped groove 116 on the optical connector 101 side.

However, a longitudinal position of the rectangular cross-sectional protruding portion 122 in the U-shaped groove 116 of the optical connector main body 105 that is a penetration groove is not substantially limited (a gap 100d illustrated in FIG. 16 is sufficiently large).

That is, the rectangular cross-sectional protruding portion 122 is precisely molded so that a difference between 100W and 100W' (difference of the groove width) is very small. However, the side in the direction perpendicular to this does not play a great role in the precise positioning process, and a rough molding precision may be enough.

The outer side surfaces 122a and 122a (the inner side surfaces of the recessed portion 123) in the width direction of the rectangular cross-sectional projecting portion 122 are planar along the side surfaces 116b and 116b of the protrusions 116a and 116a.

In a case where the optical connector 101 is attached to the substrate 103, the fitting pin 115 of the optical connector 101 is fitted to the pin hole 121 of the substrate 103 and the rectangular cross-sectional protruding portion 122 is fitted to the U-shaped groove 116, such that positioning of the optical connector 101 to the optical element 102 on the substrate 103 is performed. That is, positioning is performed at two positioning points including a positioning point implemented by fitting of the fitting pin 115 and the pin hole 121 and a positioning point implemented by fitting of the U-shaped groove 116 and the rectangular cross-sectional protruding portion 122.

At the positioning point implemented by the fitting of the fitting pin 115 and the pin hole 121, the clearance between the fitting two members (the fitting pin 115 and the pin hole 121) is extremely small, and the positioning can be achieved with good precision at the one point (one spot). Only with the one point, the optical connector may be rotated by the rotation of the fitting pin. However, at the positioning point implemented by the fitting of the U-shaped groove 116 and the rectangular cross-sectional protruding portion 122, rotation of the optical connector is restricted, and positioning in the rotational direction is achieved. That is, by the positioning of the fitting pin 115 at the one spot and the positioning of the U-shaped groove 116 in the rotational direction, positioning of the optical connector 101 to the optical element 102 on the substrate 103 can be made with good precision.

In the positioning process, there is no problem in that during the fitting of the fitting pin 115 and the pin hole 121 at the one point, the fitting pin does not fit into the counterpart pin hole.

With regard to the fitting of the U-shaped groove 116 and the rectangular cross-sectional protruding portion 122, the clearance between the U-shaped groove 116 and the rectangular cross-sectional protruding portion 122 is sufficiently small only for the surface restricting the rotation of the Optical element around the fitting in 115 of the optical connector. That is, the width 100W of the U-shaped groove 116 and the width 100W' of the rectangular cross-sectional protruding portion 122 are formed at high precision with a sufficiently small clearance. Therefore, the positioning precision of the vicinity of the fitting pin 115 of the optical connector 101 is high, and thus the optical connector 101 is positioned to the optical element 102 on the substrate 103 with good precision.

Furthermore, since the longitudinal position of the rectangular cross-sectional protruding portion 122 in the U-shaped groove 116 of the optical connector 101 side that is a penetration groove is not substantially limited (the gap 100d shown in FIG. 16 is sufficiently great), problems with the precision of the distance between the rectangular cross-sectional protruding portion 122 and the pin hole 121 do not occur, and problems in which the rectangular cross-sectional protruding portion 122 cannot be inserted into the U-shaped groove 116 do not occur.

Therefore, unlike an existing structure in which positioning is performed by fitting of fitting pins and pin holes at two points and thus there is a problem in that the fitting pin may not be inserted into the pin hole of a counterpart optical component if the precision of the pitch between the two pin holes is low, problems in which those to be fitted to each other are not fitted to each other during the positioning process or problems in which positioning precision may be degraded do not occur.

According to the present invention, as a material of the optical connector main body 105, a thermoplastic resin such as PPS or an epoxy resin may be suitably used.

As described above, setting diameters and positions of the two pins or the two pin holes to achieve high precision is not easy and necessitates expensive molding costs. However, one of the two fitting portions is implemented by the fitting of the U-shaped groove the rectangular cross-sectional protruding portion, only precision of the two surfaces that are straight portions of the rectangle needs to be ensured. Therefore, problems with pitch precision in the hole arrangement do not occur, so that molding can be easily performed at low product cost.

Here, contrary to the above-mentioned configuration, a circular cross-sectional pin and a U-shaped groove may be formed on a substrate side, and a circular hole to which the circular cross-sectional pin on the substrate side is fitted and a rectangular cross-sectional protruding portion to which the U-shaped groove on the substrate side is fitted may be formed on the optical connector side.

Example 5

Figure 19:
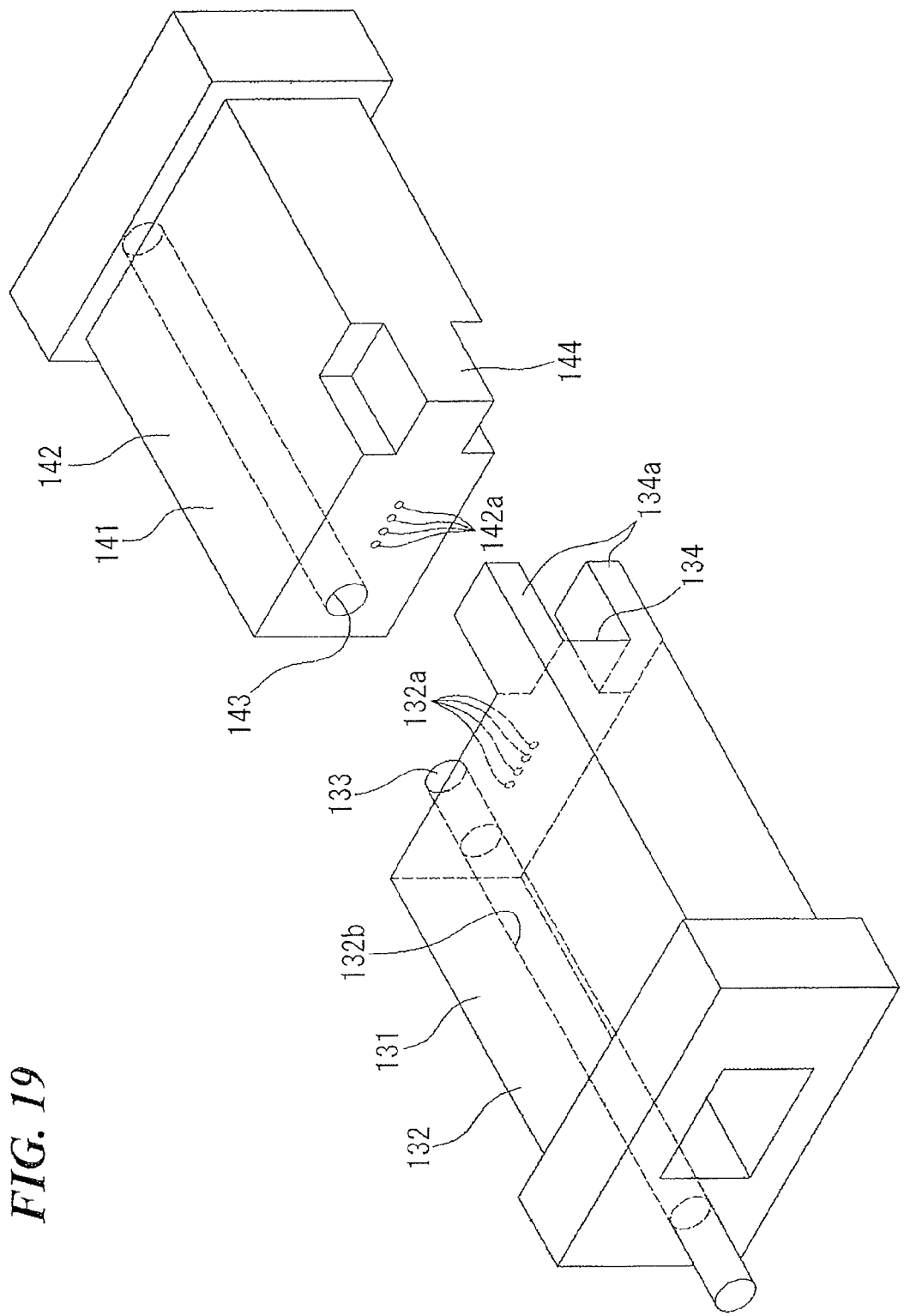
FIG. 19 is a perspective view of an optical connector according to another example of the present invention, the optical connector being used for connection between the optical connectors.

FIG. 19 illustrates an example in which the present invention is applied to an optical connector that is used for connection between optical connectors. As compared with a so-called MT optical connector having two positioning points implemented by fittings of fitting pins and pin holes, the optical connector in this example has a configuration in which only one positioning point is configured by fitting of a fitting pin to a pin hole and the opposite side is configured by fitting of a U-shaped groove to a rectangular cross-sectional protruding portion for positioning.

Specifically, as illustrated in FIG. 19, in one optical connector 131, as a positioning device which positions the optical connector 131 to the other optical connector 141, a circular cross-sectional fitting pin (hereinafter, simply referred to as a fitting pin) 133 projecting toward the other optical connector 141 and a U-shaped groove 134 are provided in a connection surface of the optical connector main body 132 of the one optical connector 131 connected to the other optical connector 141 on both sides interposing a row of optical fiber holes 132a of the optical connector main body 132 therebetween on both sides in the hole arrangement direction. The U-shaped groove 134 in the illustrated example is configured as an empty space between two protruding portions 134a provided in the optical connector main body 132 at an interval in a height direction.

The fitting pin 133 of this example is a separate member from the optical connector main body 132 and is fitted to an empty pin hole 132b of the optical connector main body 132. However, the fitting pin 133 may be a fitting pin formed integrally with the optical connector main body 132.

The optical connector main body 142 of the other optical connector 141 is provided with a pin hole 143 to which the fitting pin 133 of the one optical connector 131 is to be fitted, and a rectangular cross-sectional protruding portion 144 to be fitted to the U-shaped groove 134 of the optical connector main body 132 of the one optical connector 131. Reference numeral 142*a* indicates optical fiber holes in the other optical main body 142.

When a pair of the optical connectors 131 and 141 are connected to each other, the fitting pin 133 of the optical connector main body 132 of the one optical connector 131 is fitted to the pin hole 143 of the optical connector main body 142 of the other optical connector 141, and the rectangular cross-sectional protruding portion 144 of the other optical connector main body 142 is fitted to the U-shaped groove 134 of the one optical main body 132, thereby positioning the two optical connectors 131 and 141 to each other. That is, positioning is performed at the two points including a positioning point implemented by the fitting of the fitting pin 133 and the pin hole 143 and a positioning point implemented by the fitting of the U-shaped groove 134 and the rectangular cross-sectional protruding portion 144.

Therefore, it is possible to obtain the same effect as the effect of the optical connector 101 described with reference to FIGS. 11 to 18B. That is, unlike an existing MT optical connector in which positioning is performed by fitting of fitting pins and pin holes at two points and thus there is a problem in that the fitting pin may not be inserted into the pin hole of a counterpart optical component if the precision of the pitch between the two pin holes is low, problem in which those to be fitted to each other are not fitted to each other during the positioning process do not occur.

Example 6

Figure 20:
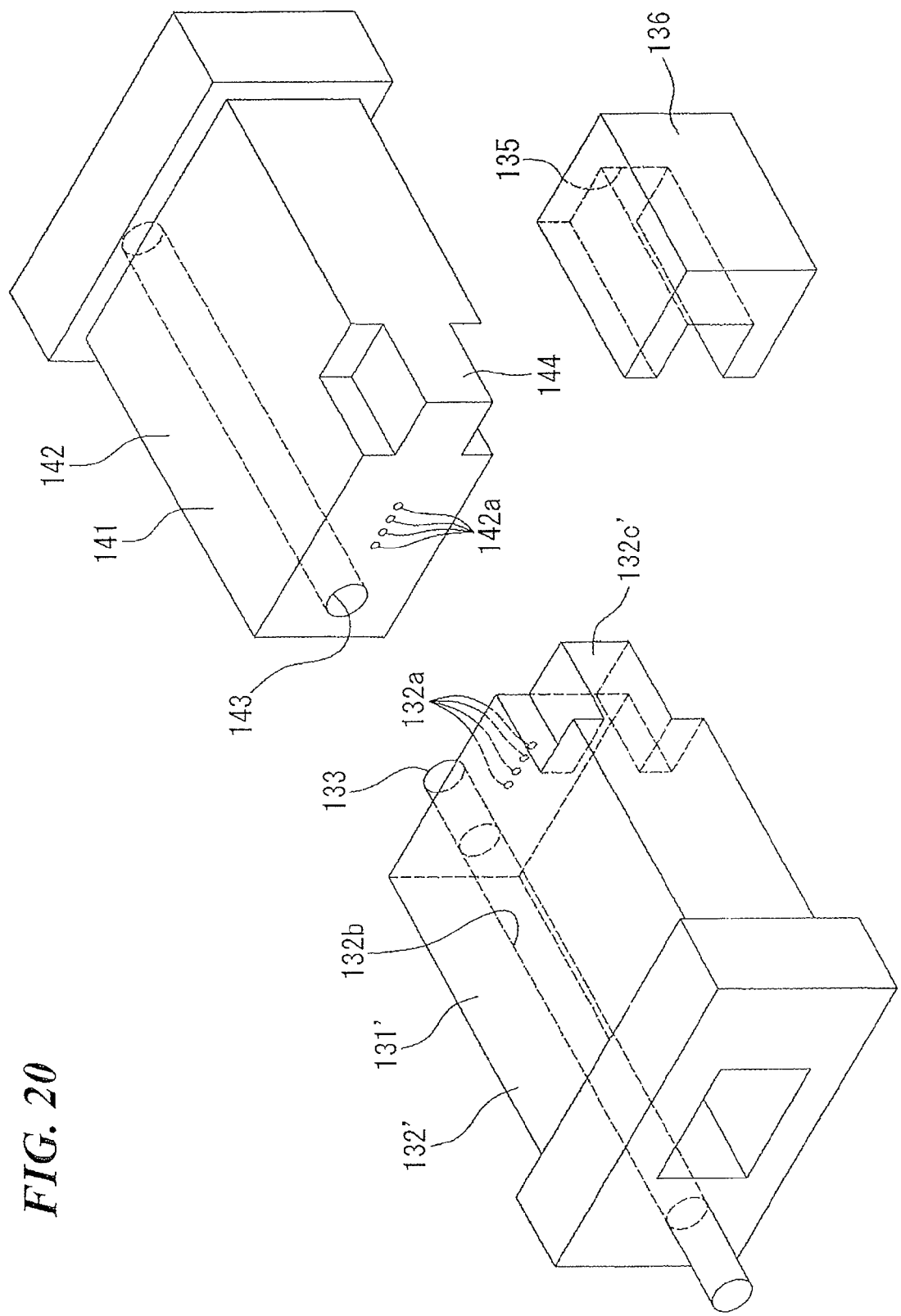
FIG. 20 is a perspective view of an optical connector according to another example, the optical connector being used for connection between the optical connectors.

FIG. 20 shows an example modified from the example illustrated in FIG. 19. In this example, the U-shaped groove 134 provided in the optical connector main body 132 of the one optical connector 131 illustrated in FIG. 19 is configured as a separate member that can be attached to or detached from the optical connector main body. That is, as illustrated in FIG. 20, a U-shaped groove member 136 having a U-shaped groove 135 of which the length is twice that of the U-shaped groove 134 illustrated in FIG. 19 is provided as a separate member from the optical connector main body 132' of one optical connector 131', and the U-shaped groove member 136 is attached to an attaching protruding portion 132*c'* provided in the optical connector main body 132' such that a rectangular cross-sectional protruding portion 144 of a counterpart optical connector 141 can be fitted to the U-shaped groove 135.

When the forward portion of the U-shaped groove 135 of the U-shaped groove member 136 is fitted to the fitting protruding portion 132*c'* provided in the optical connector main body 142, a counterpart portion of the U-shaped groove 135 of the U-shaped groove member 136 has the same function as that of the U-shaped groove 134 illustrated in FIG. 19. The attaching protruding portion 132*c'* may be set to have the same shape and dimension as well as the precision as those of the rectangular cross-sectional protruding portion 144 provided in the optical connector main body 142 of the other optical connector 141.

Even in this example, as in the example of FIG. 19, the same effect as that of the optical connector 101 illustrated in FIGS. 11 to 18B can be obtained.

In addition, in this example in which the U-shaped groove member 136 having the U-shaped groove 135 is a separate member from the optical connector main body, the U-shaped groove member 136 is neither of the two optical connectors 131' and 141 and may be treated as an independent member.

In addition, in each example, the number of rectangular cross-sectional protruding portions to be fitted to U-shaped grooves is not limited to one as long as a fixed face opposed to both wall portions forming the U-shaped groove is configured, so that the rectangular cross-sectional protruding portion for exemplifying the fixed face may be provided in every wall. That is, two rectangular cross-sectional protruding portions may be provided separately in the width direction. Otherwise, it is needless to say that the cross-section is not limited to a rectangular shape as long as the rectangular cross-sectional protruding portion configures a face that confronts the U-shaped groove. According to the present invention, for the convenience of description, a term "rectangular cross-sectional protruding portion" is used. However, it is needless to say that the term includes various modifications of a cross-section of a protruding portion.

In the examples described above, one case in which the optical component is the same type of optical connector and another case in which the optical component is an optical path conversion-type optical connector which is mounted on a substrate.

However, the optical component connected to the optical connector is not limited thereto.

For example, an optical component in which the end surface of an optical waveguide such as an optical fiber is exposed to the end surface connected to the optical connector may be used, and various modifications exist.

In addition, according to the present invention, by the precise positioning structure configured in a method using a single circular fitting pin and the fitting structure configured by the recessed and protruding portions on the connection faces besides the single circular fitting pin method, it is possible to partially omit elements used for positioning, thereby realizing precise positioning of the optical connector at low molding cost. This basic combination may be provided with various modifications in addition to the examples and all of those are included in the present invention.

Example 7

FIGS. 21 to 27B illustrate an optical connector 201 according to another example of the present invention.

Figure 21:
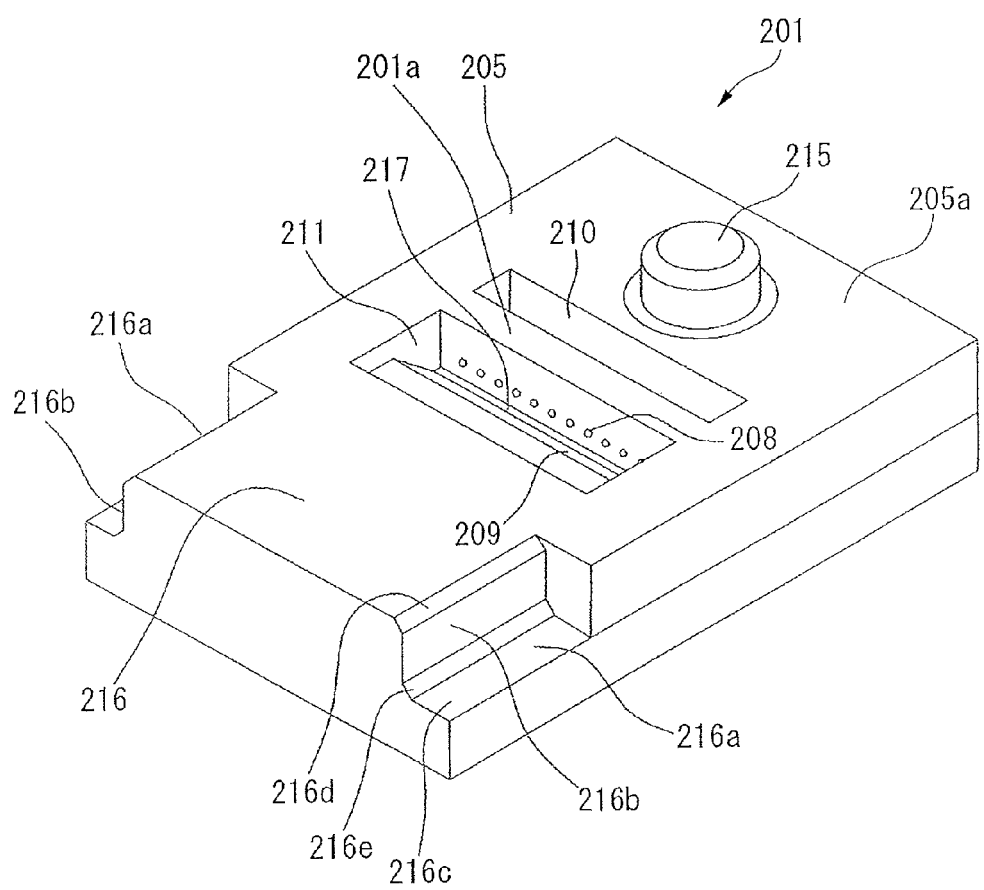
FIG. 21 is a perspective view of an optical connector according to another example of the present invention, the optical connector being positioned to an optical element on an substrate including the optical element and being mounted to the substrate.

FIG. 21 is a perspective view of the optical connector 201. As illustrated in FIG. 21, a fitting pin 215 (fitting protruding portion) projects from a flat connection face (attaching surface) 205*a* of the optical connector 201.

An adhesive charge window 210 and a recessed point 211 through which light from the optical connector is input and output are open to the connection surface 205*a* with an intermediate portion 201*a* interposed therebetween. On a side from the recessed point 211 where a fitting pin does not exist, cut-off portions 216*a* (fitting recessed portion) (side surface fitting recessed portion) are formed to oppose to each other in the width direction of the optical connector.

The recessed point 211 is configured as an optical input and output portion 217 in which a plurality of optical paths of light reflecting from a reflective surface 209 to an optical element 202 are formed.

In the optical input and output portion 217, optical fiber holes 208 are open in a transverse row, and a side opposed to the optical fiber holes is configured as an inclined surface (the reflective surface) 209 for reflecting light.

The two cut-off portions 216*a* (recessed portions) include wall surfaces 216*b* that vertically descend from the connection surface 205*a* and plane surfaces 216*c* that are lowered by the same amount in parallel with the connection surface 205*a*.

The wall surfaces 216*b* and 216*b* of the cut-off portions 216*a* and 216*a* in the width direction are planar and follow a pitch direction (the left and right direction of FIG. 22) of the fitting pin 215 and the cut-off portions 216a and 216a.

The pitch direction is a direction along a line connecting a fitting portion (fitting protruding portion or fitting recessed portion) in a first region (as described below) and a fitting portion (fitting protruding portion or fitting recessed portion) in a second region (as described below).

When a plurality of fitting portions are provided on one side, the pitch direction may be a direction along a line connecting the average position of the fitting portions on the one side and a fitting portion on the other side, or a direction along a line connecting any of the fitting portions on the one side and the fitting portion on the other side.

Figure 22:
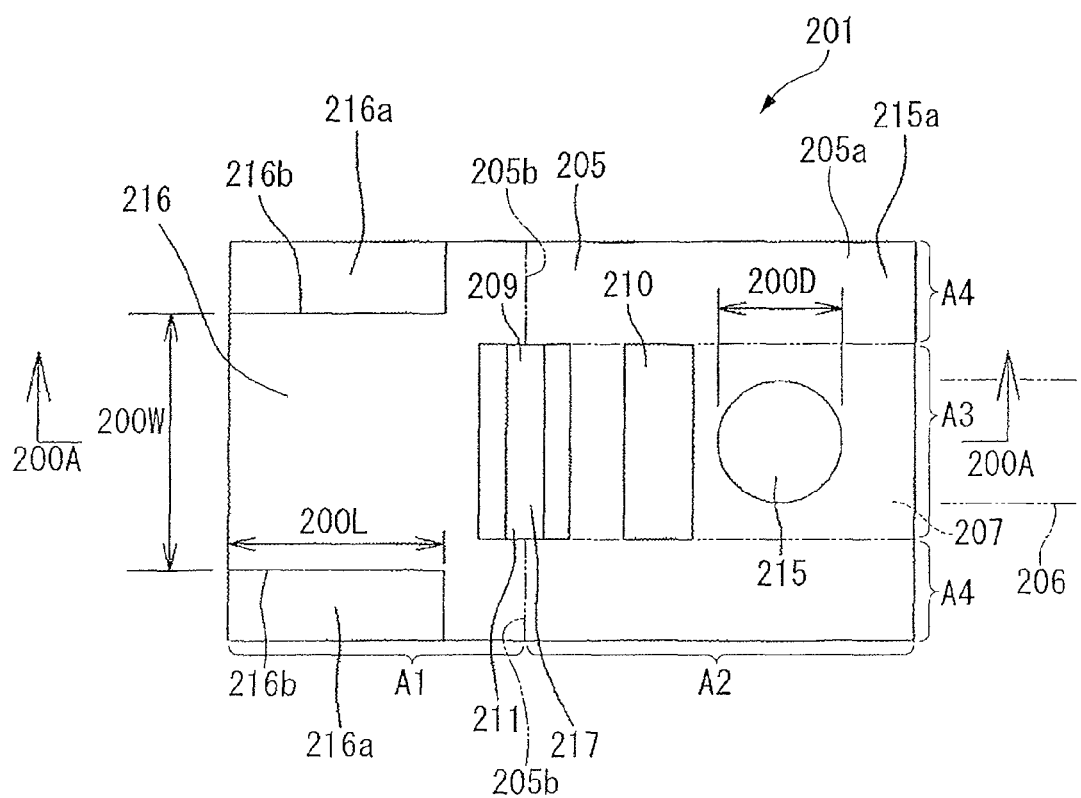
FIG. 22 is a plan view of the optical connector illustrated in FIG. 21.

In the example illustrated in FIG. 22, since there are two cut-off portions 216a and 216a, the pitch direction is a direction along the shortest line connecting the fitting pin 215 and an intermediate position between the cut-off portions 216a and 216a, that is, a left and right direction in FIG. 22.

Alternatively, the pitch direction may be a direction along a line connecting the fitting pin 215 and one of the cut-off portions 216a and 216a, or a direction along a line connecting the fitting pin 215 and an arbitrary intermediate position between the cut-off portions 216a and 216a.

Further, when more than three cut-Off portions 216a are provided, it may be arranged such that two of the cut-off portions 216a and 216a that are most distant from each other in the rotational direction with respect to the fitting pin 215 are specified, and then the pitch direction is designated to a direction along a line connecting the fitting pin 215 and any of the specified two of the cut-off portions 216a and 216a, or a direction along a line connecting the fitting pin 215 and an intermediate position between the specified two of the cut-off portions 216a and 216a.

The wall surfaces 216b and 216b are opposed to vertical wall surfaces 222b and 222b of protrusions 222a and 222a of a substrate 203 described later.

As illustrated in FIG. 22, the structural elements described above are arranged symmetrically in the vertical direction with respect to a line 200A-200A crossing the connection surface 205a in the left and right direction of the paper surface, and the wall surfaces 216b of the two cut-off portions 216a which are opposed to each other are in parallel, the length of the wall surfaces 216b being 200L.

Figure 23:
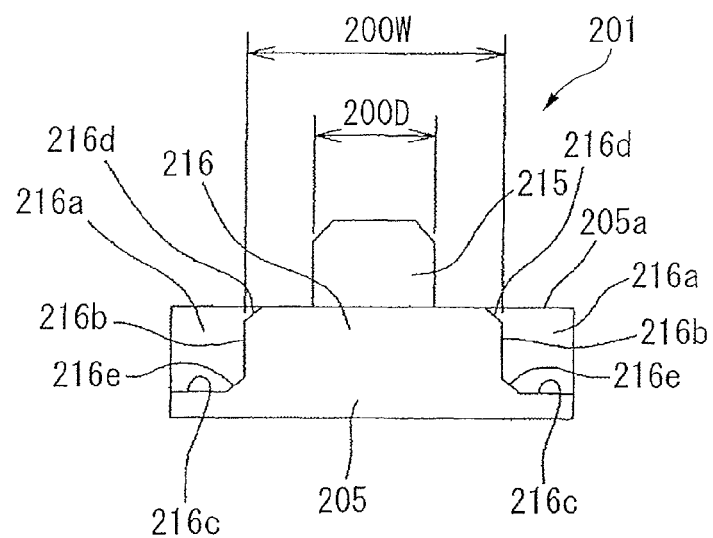
FIG. 23 is a left side view of the optical connector illustrated in FIG. 21.

As illustrated in a left side view of FIG. 23, the cut-off portion 216a is shown as a rectangular cross-section, an edge of the wall surface 216b on the connection surface 205a side is a tapered surface 216d, and a portion between the wall surface 216b and the plane surface 216c is a tapered surface 216e connecting the surfaces to each other.

The connection surface 205a between the two cut-off portions 216a is configured as a protruding portion 216 having a width W.

Figure 24:
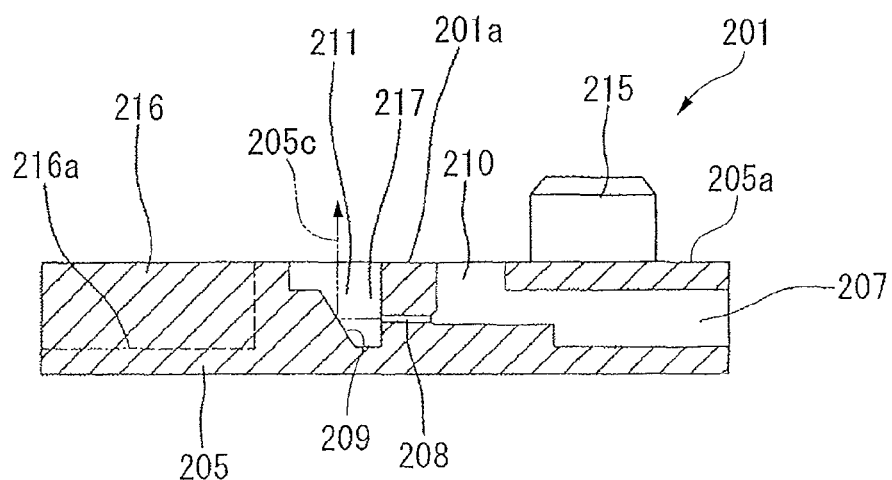
FIG. 24 is a cross-sectional view taken along the line 200A-200A of FIG. 22.

FIG. 24 is a transverse cross-sectional view taken along the line 200A-200A of FIG. 22. In FIG. 24, a hollow portion 207 is open to insert an optical fiber (ribbon) on a right end portion of a paper surface.

In the intermediate portion 201a that is a resin solid portion, the plurality of optical fiber holes 208 that are arranged in the transverse row toward the vertical direction with respect to the paper surface and are in parallel with the connection surface 205a are open, and the fitting pin 215 stands on the hollow portion 207.

Figure 25:
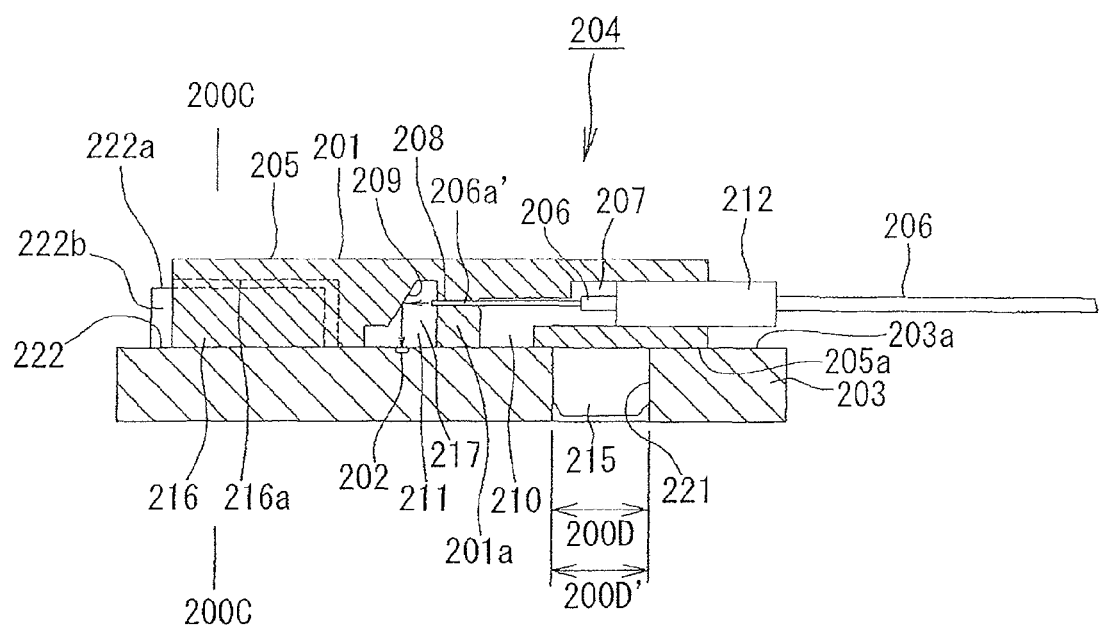
FIG. 25 is a cross-sectional view illustrating a state where the optical connector is mounted on the substrate (cross-sectional view taken along the line 200B-200B of FIG. 26).

FIG. 25 is a central cross-sectional view showing a state where the optical connector is mounted on a substrate 203 (optical component).

As illustrated in FIG. 25, the optical connector 201 is assembled to the front end of an optical fiber ribbon 206 and is attached to the substrate 203 provided with at least one optical element 202.

The optical element 202 has an optical axis perpendicular to the optical axis direction of the optical fiber ribbon 6 (the optical axis direction of the front end of the optical fiber ribbon 206).

The optical connector 201 is an optical path conversion-type optical connector for converting an optical path of the optical fiber ribbon 206 that is parallel to the substrate 203 into a perpendicular path toward a substrate surface and has an optical connector main body 205.

The optical connector main body 205 has the hollow portion 207 into which the cladding of the optical fiber ribbon 206 that is being introduced parallel to the substrate 203 is inserted.

The front end of the optical fiber ribbon 206 is inserted into the optical fiber hole 208 provided in the intermediate portion 201a in front of (in the left direction of the paper surface of FIG. 25) the hollow portion 207.

The side surface of the recessed point 211 that opposes an outlet of the optical fiber hole 208 is inclined at 45° with respect to the optical axis direction of the optical fiber.

The resin surface of the inclined surface is formed as the reflective surface 209 (reflective portion or optical path converting portion) by metal deposition, metal plating or the like.

The reflective surface 209 extends in the vertical direction with respect to the paper surface along the openings of the optical fiber holes 208.

A bare fiber 206a' formed by removing the covering of an optical fiber 206a constituting the optical fiber ribbon 206 is inserted into the optical fiber hole 208.

The optical fiber ribbon 206 and the bare fiber 206a' are fixed by an adhesive charged through an adhesive insertion window 210.

The front end of the optical fiber ribbon 206 slightly projects from the recessed point 211.

The recessed point 211 having the reflective surface 209 is filled with an adhesive that is transparent to the wavelength used, and although not particularly shown in the figure, the recessed point 211 is sealed with a transparent glass.

Reference numeral 212 denotes a rubber boot for protecting a base of the optical fiber ribbon.

As a type of the optical fiber used here, a standard SM-type optical fiber entirely made of quartz or a GI-type optical fiber may be suitably employed.

Otherwise, an optical fiber having a diameter of 80 μm smaller than a standard diameter of 125 μm may be used. Alternatively, an optical fiber entirely made of plastic may be used.

In the optical connector 201, as a positioning device which positions the optical connector 201 to the optical element 202 on the substrate 203, a circular cross-sectional fitting pin (hereinafter, simply referred to as a fitting pin) 215 (fitting protruding portion) projecting toward the substrate 203 is provided in an opposed surface 205a (connection end surface) of the optical connector 201 opposed to the substrate 203.

The fitting pin 215 is a circular fitting protruding portion that is circular in the plan view and is fitted to a fitting hole 221 (fitted recessed portion) that is circular in plan view and is provided in the substrate 203.

It is preferable that the fitting pin 215 be an integrated resin molded product integrated with the optical connector main body 205. In addition, a fitting pin made of resin or metal may also be adhered to or implanted into a connection surface of the optical connector main body at a predetermined position as a separate member after molding the optical connector main body using resin.

As illustrated in FIG. 22, the surface 205a (connection end surface) of the optical connector main body 205 opposed to the substrate 203 is partitioned into a first region A1 on the front end side of the optical fiber ribbon 206 (on the left in FIG. 22) and a second region A2 on the opposite side to the front end side (on the right in FIG. 22) with the optical path from the optical connector main body 205 to the substrate 203 (from the substrate 203 to the optical connector main body 205) interposed therebetween.

As illustrated in FIGS. 22 and 24, a boundary line 205b of the first region A1 and the second region A2 is, for example, a line perpendicular to the optical path (or an optical path from the optical element 202 to the reflective surface 209) from the reflective surface 209 to the optical element 202 and the optical axis direction of the front end of the optical fiber ribbon 206 through a point of intersection 205c (see FIG. 24) between a surface including the surface 205a (the connection end surface) of the optical connector main body 205 and the optical path (see FIG. 22).

As illustrated in FIG. 22, the second region A2 is partitioned into a region which is a perpendicular projection of the hollow portion 207 on to the surface 205a (hereinafter referred to as a hollow region A3) and the remaining region (remaining region A4).

The fitting pin 215 is formed in the second region A2 (specifically, in the hollow region A3), and the cut-off portions 216a and 216a are formed in the first region A1.

Figure 26:
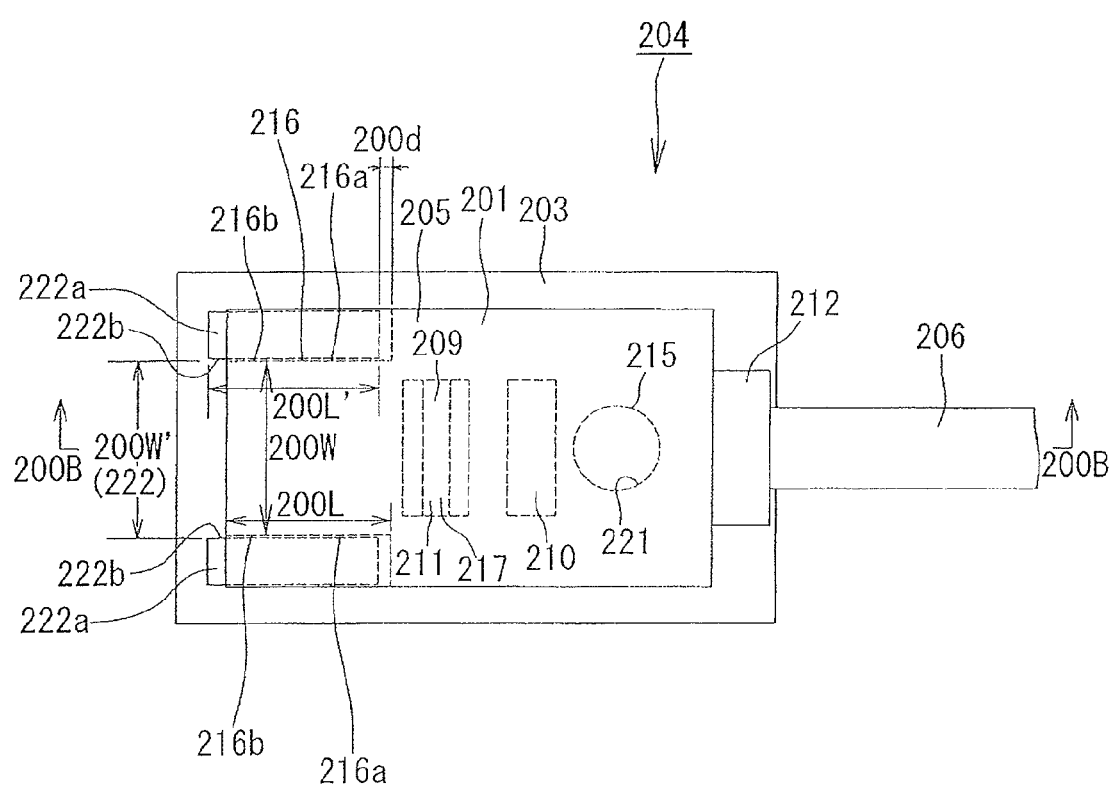
FIG. 26 is a plan view illustrating the state where the optical connector is mounted on the substrate.
Figure 27A:
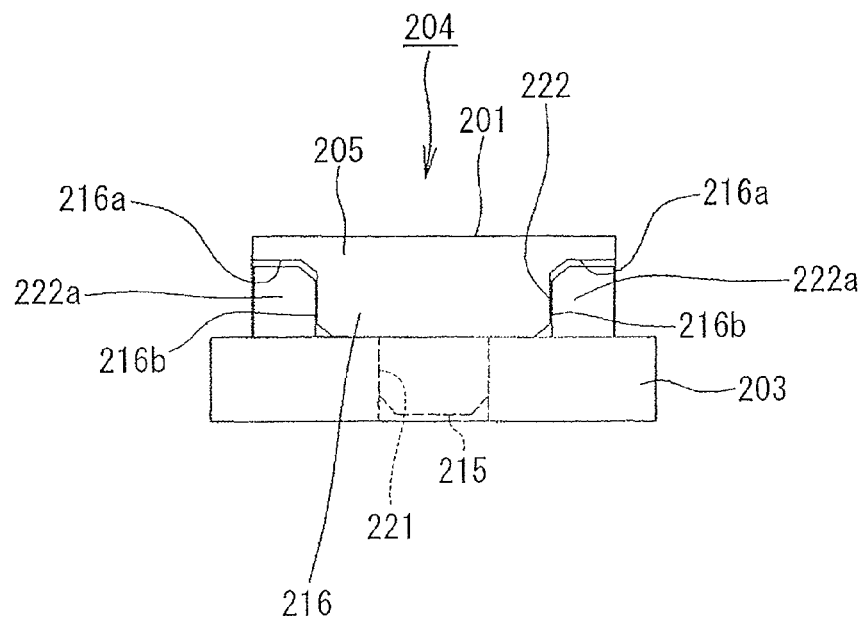
FIG. 27A is a left side view of FIG. 25.

FIG. 26 is a plan view illustrating a state where the optical connector is mounted on the substrate 203. FIG. 27A is a left side view illustrating the state where the optical connector is mounted on the substrate 203, and FIG. 27B is a cross-sectional view illustrating a part of a protruding portion 216.

Figure 27B:
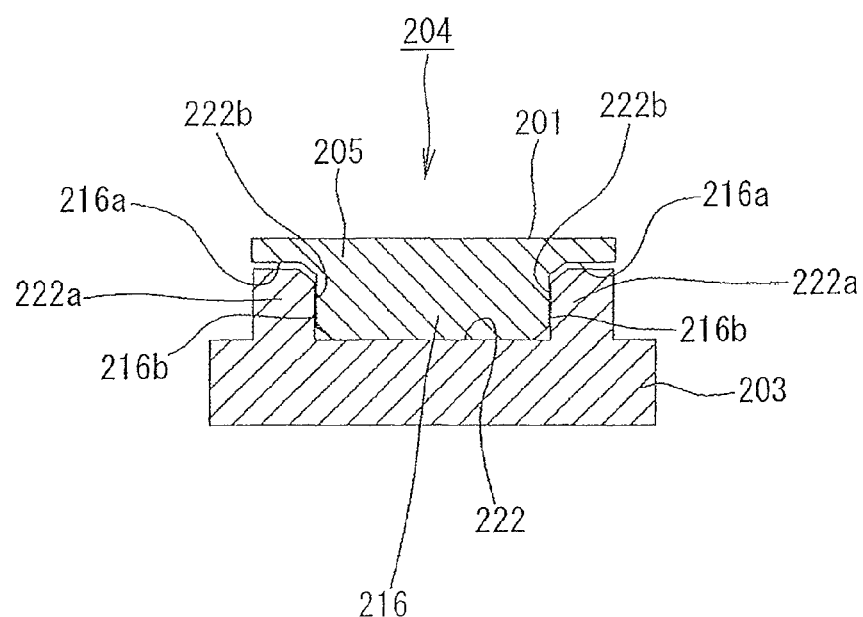
FIG. 27B is a cross-sectional view taken along the line 200C-200C of FIG. 25.

As illustrated in FIGS. 26 to 27B, the substrate 203 to which the optical connector is positioned has the pin hole 221 (fitted recessed portion) that is circular in plan view at a position corresponding to the fitting pin 215 of the optical connector 201 and the two protrusions 222a (fitted protruding portion) that are parallel with the paper surface direction of FIGS. 27A and 27B at positions corresponding to the two cut-off portions 216a of the optical connector 201.

Both side surfaces of the protrusions 222a stand vertically from the substrate surface, and an interval between an inner side surface of the one protrusion and an inner side surface of the other protrusion is substantially the same as the width of the protruding portion 216.

That is, a width of a groove portion 222 between the protrusions 222a is substantially the same as the width of the protruding portion 216.

As described above, the optical element may not be directly disposed on a circuit pattern on a substrate and may be mounted on a base (called various names such as a module base or an optical module) placed on the substrate. The substrate 203 of this example corresponds to the module base. It is preferable that the pin hole be not directly processed on the substrate and be processed on the substrate 203 as in the example, that is, in the module base. Here, points where pin holes are to be formed are not limited to the above.

The precision of an inner diameter 200D' of the circular pin hole 221 may be set to be substantially the same as the tolerance of a pinhole of a standard MT optical connector having two pin holes. The diameter of the pin hole is formed at a high precision with an extremely small clearance for the outer diameter 200D of the fitting pin 215 of the optical connector 201.

The outer diameter of the fitting pin 215 on the connection surface 205a is denoted by 200D, and the width and length of the protruding portion 216 between the rectangular cross-sectional cut-off portions 216a formed in the width direction of the optical direction (in the vertical direction with respect to the paper surface) are denoted by 200W and 200L, respectively.

The precision of the interval 200W' between the inner vertical wall surfaces 222b of the protrusions 222a on both side of the width direction of the optical connector is set to be a high precision with a sufficiently smaller clearance for the width 200W between the vertical wall surfaces 216b of the vertical wall cut-off portions 216a on both sides of the width direction of the optical connector main body 205.

However, a longitudinal position of the protruding portion 216 is not substantially limited in the groove portion 222 that is a penetration groove (a gap 200d illustrated in FIG. 26 is sufficiently large).

That is, the protruding portion 216 is precisely molded so that a difference between 200W and 200W' (a difference of the groove width) is very small. However, a dimension (200L and 200L' of FIG. 26) in the direction perpendicular to this does not play a great role in the precise positioning process as long as the gap 200d is sufficiently large, so that a rough molding precision may be enough.

In a case where the optical connector 201 is attached to the substrate 203, the fitting pin 215 of the optical connector 201 is fitted to the pin hole 221 of the substrate 203 and the protruding portion 216 is fitted to the groove portion 222, such that positioning of the optical connector 101 to the optical element 202 on the substrate 203 is performed.

That is, precise positioning is performed at a positioning point implemented by fitting of the fitting pin 215 and the pin hole 221 and a positioning point implemented by fitting of the protruding portion 216 of the optical connector and the groove portion 222 formed between the two protrusions 222a.

At the positioning point implemented by the fitting of the fitting pin 215 and the pin hole 221, the clearance between the fitting two members (the fitting pin 215 and the pin hole 221) is extremely small, and the positioning can be achieved with good precision at the positioning point (one spot).

Only with the positioning point, the optical connector may be rotated by the rotation of the fitting pin. However, at the positioning point implemented by the fitting of the protruding portion 216 and the groove portion 222, rotation of the optical connector, and positioning in the rotational direction is achieved.

That is, by the positioning of the fitting pin 215 at the one spot and the positioning of the protruding portion 216 in the rotational direction, positioning of the optical connector 201 to the optical element 202 on the substrate 203 can be made with good precision.

In the positioning process, there is no problem in that during the fitting of the fitting pin 215 and the pin hole 221 at the one point, the fitting pin does not fit into the counterpart pin hole.

With regard to the fitting of the protruding portion 216 and the groove portion 222, the clearance between the protruding portion 216 and the groove portion 222 is sufficiently small only for the surface restricting the rotation of the optical element around the fitting pin 215 of the optical connector. That is, the width 200W of the protruding portion 216 and the width 200W' of the groove portion 222 are formed at high precision with a sufficiently small clearance. Therefore, the positioning precision of the vicinity of the fitting pin 215 of the optical connector 201 is high, and thus the optical connector 201 is positioned to the optical element 202 on the substrate 203 with good precision.

Furthermore, since the longitudinal position of the protruding portion 216 in the groove portion 222 that is a penetration groove is not substantially limited (the gap 200d shown in FIG. 26 is sufficiently great), problems with the precision of the distance between the groove portion 222 and the pin hole 221 do not occur, and problems in which the protruding portion 216 cannot be inserted into the groove portion 222 do not occur.

Therefore, unlike an existing structure in which positioning is performed by fitting of fitting pins and pin holes at two points and thus there is a problem in that the fitting pin may not be inserted into the pin hole of a counterpart optical component if the precision of the pitch between the two pin holes is low, problems in which those to be fitted to each other are not fitted to each other during the positioning process or problems in which positioning precision may be degraded do not occur.

As a material of the optical connector main body 205, a thermoplastic resin such as PPS or an epoxy resin may be suitably used.

As described above, setting diameters and positions of the two pins or the two pin holes to achieve high precision is not easy and necessitates expensive molding costs. However, one of the two fitting portions is implemented by the fitting of the protruding portion and the groove portion, and only the precision of the two surfaces on the both sides of the width direction of the optical connector needs to be ensured. Therefore, problems with pitch precision in the hole arrangement do not occur, so that molding can be easily performed at low product cost.

Here, contrary to the above-mentioned configuration, a circular cross-sectional pin and a protruding portion formed between cut-off portions on both sides of a width direction of the optical connector may be formed on a substrate side; and a circular hole to which the circular cross-sectional pin on the substrate side is fitted and a groove portion formed between two protrusions fitted to the cut-off portions on the both sides of the width direction of the optical connector may be formed on the optical connector side.

Example 8

Figure 28:
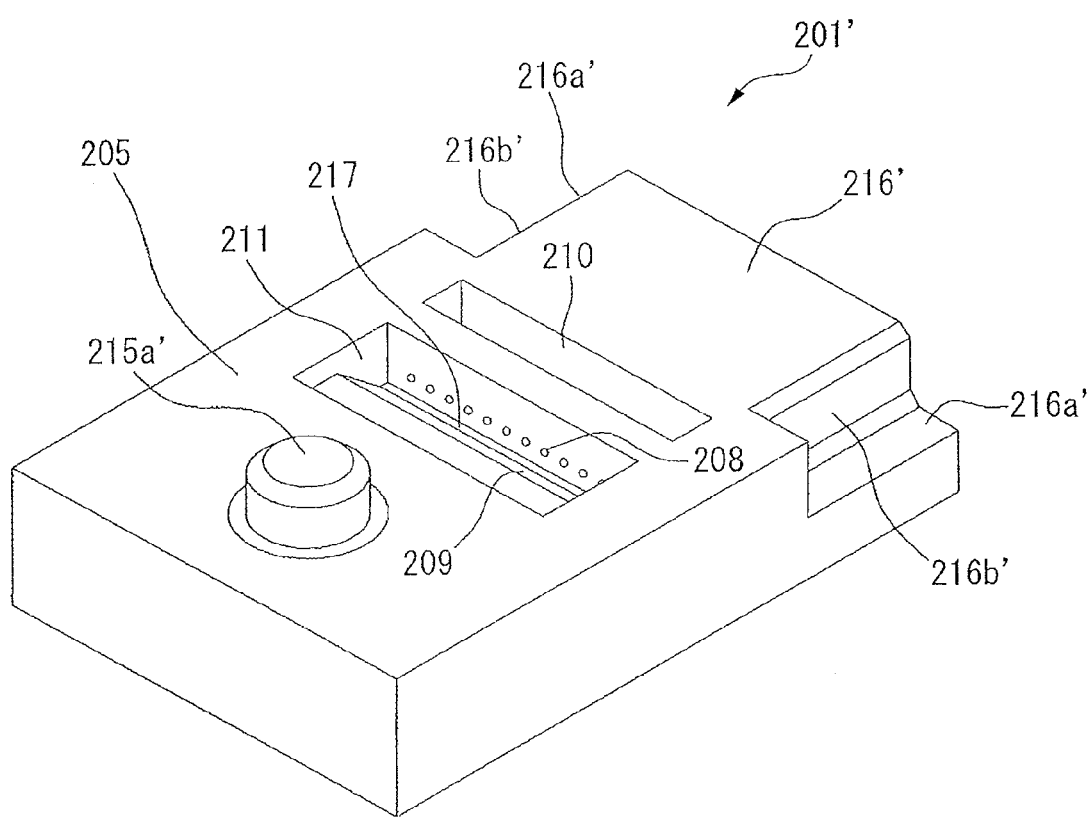
FIG. 28 is a perspective view illustrating an optical connector according to another example of the present invention and corresponds to FIG. 21.
Figure 29:
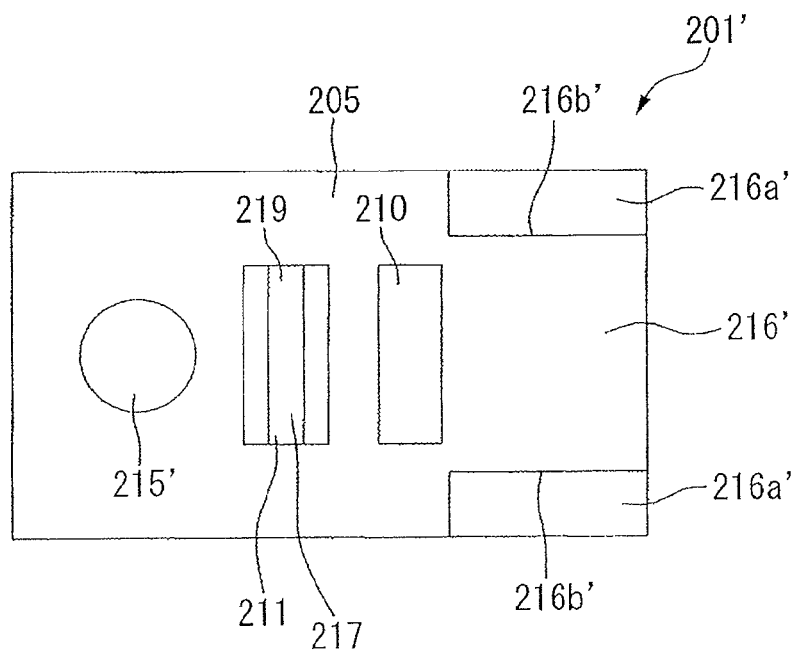
FIG. 29 is a plan view of the optical connector of FIG. 28.
Figure 30:
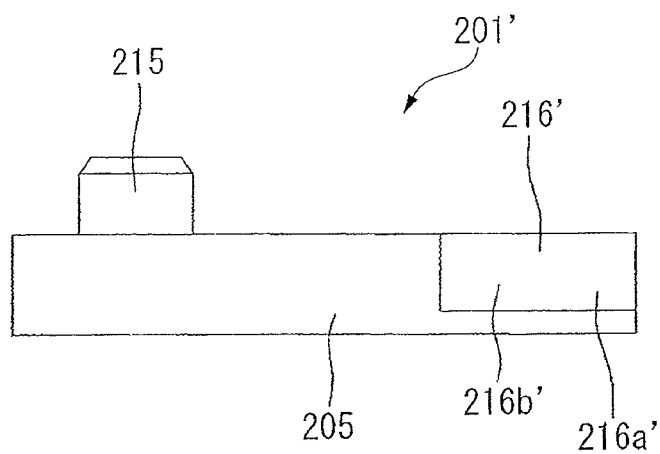
FIG. 30 is a front view of the optical connector of FIG. 28.

FIGS. 28 to 30 illustrate an optical connector 201' according to another example. The optical connector 201' has a configuration in which a positional relationship between a fitting pin 215' and a protruding portion 216' is reverse to the positional relationship between the fitting pin 215 and the protruding portion 216 in the optical connector 201 described with reference to FIGS. 21 to 27B.

That is, although the fitting pin 215' and the protruding portion 216' are provided on the connection surface of the optical connector 201' as described above on both sides interposing a optical input and output portion 217 therebetween, in this example, the fitting pin 215' (fitting protruding portion) is disposed on a forward side (on the left in FIGS. 29 and 30) of an optical fiber insertion direction, and the protruding portion 216' is disposed on a rearward side (on the right of FIGS. 29 and 30) of the optical fiber insertion direction. The configuration of other components is the same as that of the above-mentioned examples. The protruding portion 216' is configured as a portion between cut-off portions 216a' (fitted recessed portion) on both sides of the width direction of the optical connector. A vertical wall surface is denoted by 216b'.

The fitting pin 215' is formed in a first regionA1, and the cut-off portions 216a' are formed in a second region A2 (specifically, in a remaining region A4).

In this example, the arrangement of the fitting pin 215' and the cut-off portion 216a' described above is very effective when the arrangement is preferable in terms of a wiring layout of the substrate side.

In the examples described above, as an optical component, an optical path conversion-type optical connector which is mounted on a substrate may be used.

However, the optical component connected to the optical connector is not limited thereto.

For example, an optical component in which the end surface of an optical waveguide such as an optical fiber is exposed to the end surface connected to the optical connector may be used, and various modifications exist.

In addition, the optical component to be connected is not limited by an optical component on a circuit board according to this example.

While the examples of the present invention have been described, various modifications of arrangements of fitting pins, protrusions, protruding portions such as rectangular cross-sectional projecting portions, and recessed portions such as cut-off portions in the optical connector can be made.

Figure 31A:
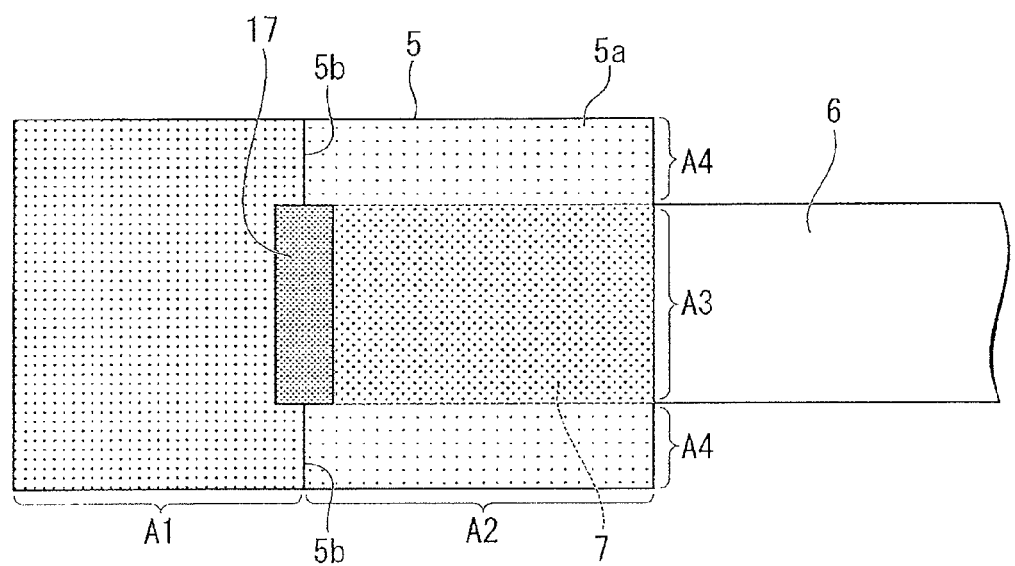
FIG. 31A is a plan view schematically illustrating regions on a connection surface of an optical connector main body.
Figure 31B:
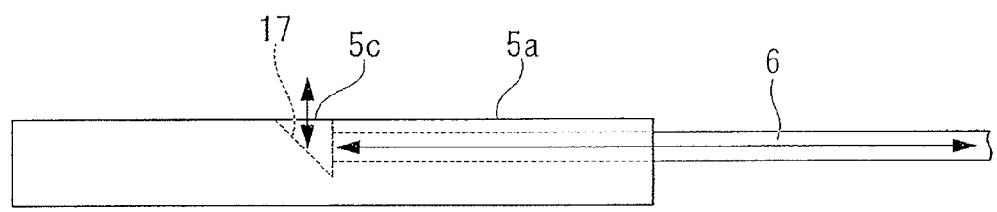
FIG. 31B is a side view of an optical connector main body illustrated in FIG. 31A.

As illustrated in FIGS. 31A and 31B, a connection end surface 5a of the optical connector main body 5 is partitioned into a first regionA1 on the front end side of an optical fiber ribbon 6 and a second region A2 on the opposite side to the front end side with an optical path toward the substrate (or an optical path from the substrate to the optical connector main body) interposed therebetween Specifically, the first region A1 is on the front end side of the optical fiber ribbon 6 with respect to a boundary line 5b, and the second region A2 is opposite side to the front end side.

The boundary line 5b is a line perpendicular to an optical path (or an optical path from an optical element 2 to a reflective surface 9) from the reflective surface 9 to the optical element 2 and the optical axis direction of the front end of the optical fiber ribbon 6 through a point of intersection 5c (see FIG. 31B) between a surface including the connection end surface 5a of the optical connector main body 5 and the optical path (see FIG. 31A).

As illustrated in FIG. 31A, the second region A2 is partitioned into a hollow region A3 that is a projection of a hollow portion 7 and a remaining region A4 (regions on both sides of the hollow region A3). In addition, arrows in FIG. 31B denote the optical paths of the optical fiber.

Like elements in FIGS. 32A to 42B are denoted by like reference numerals of the components of the examples, and detailed description thereof will be omitted.

In FIGS. 32A to 35B, an example in which one or more protruding portions or recessed portions are provided in the first regionA1 and one or more protruding portions or recessed portions are provided in the second region A2 is schematically illustrated.

In such examples, the protruding portion and the recessed portion of the second region A2 is provided in the remaining region A4. In addition, FIGS. 32A, 33A, 34A, and 35A are plan views of optical connector main bodies 405, 505, 605, and 705 (optical connectors 401, 501, 601, and 701), respectively, and FIGS. 32B, 33B, 34B, and 35B are corresponding side views.

As illustrated in FIGS. 32A to 35B, as the protruding portion, a fitting pin 15 or a protrusion 116a may be employed. In addition, as the recessed portion, a cut-off portion 216a or a rectangular cross-sectional groove portion 16a having a rectangular cross-section (see FIGS. 35A and 35B) may be employed.

Figure 32A:
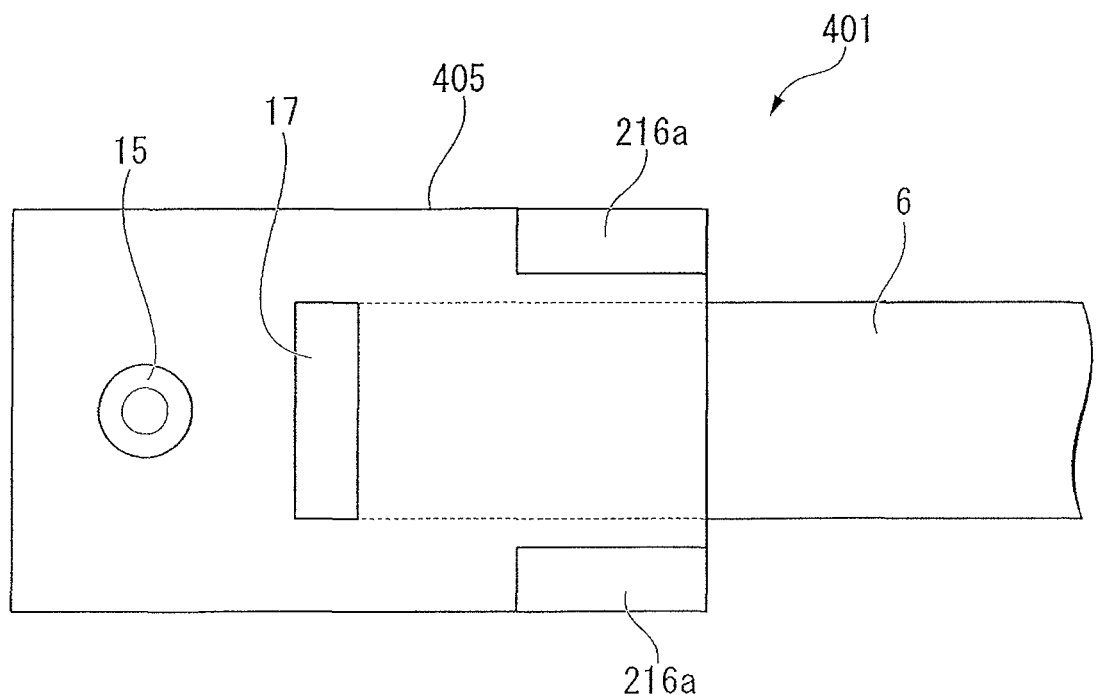
FIG. 32A is a plan view illustrating an arrangement of protruding portions or recessed portions in regions of an optical connection surface.
Figure 32B:
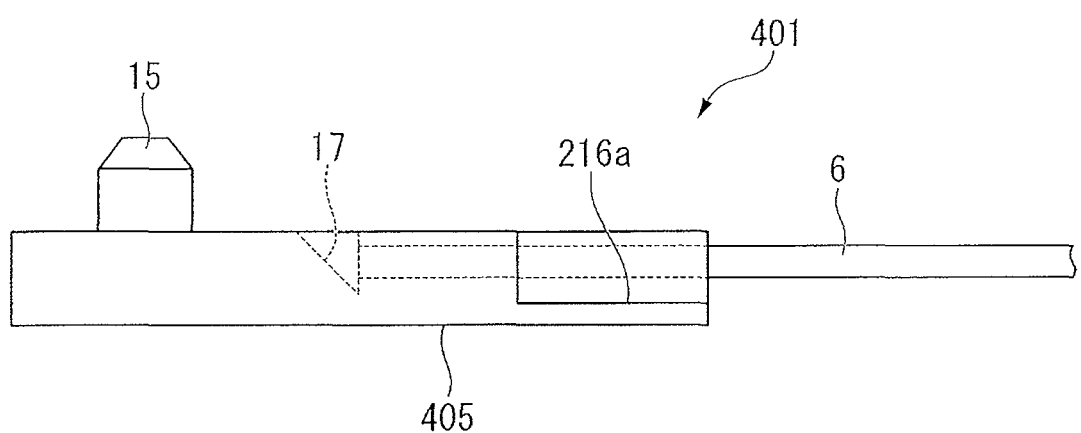
FIG. 32B is a side view of an optical connector main body in FIG. 32A.

In the example illustrated in FIGS. 32A and 32B, the fitting pin 15 is provided in the first region A1, and the cut-off portions 216a and 216a are provided in the both parts of the remaining region A4.

It is noted that, in the above example, a fitting recessed portion that is circular in a plan view may be provided in stead of the fitting pin 15. This circular fitting recessed portion is capable of fitting into a fitted protruding portion that is circular in a plan view and provided on the substrate 3.

Figure 33A:
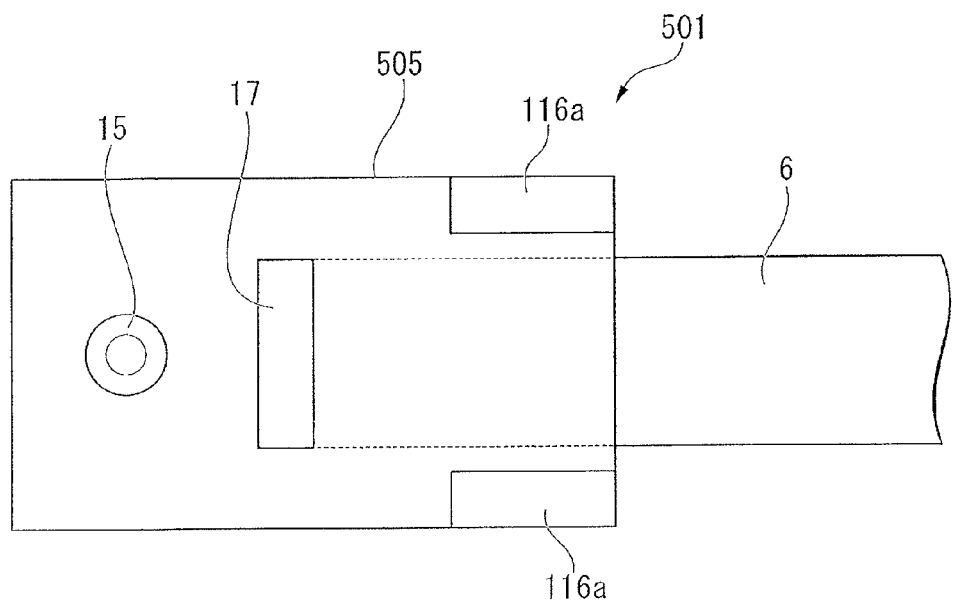
FIG. 33A is a plan view illustrating an arrangement of protruding portions or recessed portions in regions of an optical connection surface.
Figure 33B:
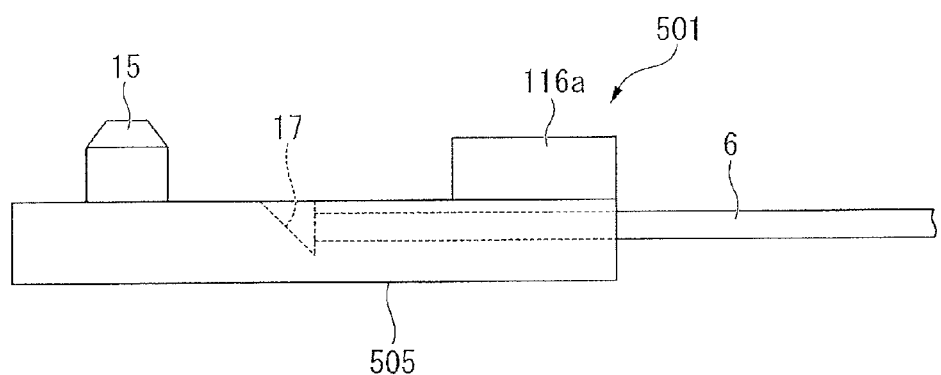
FIG. 33B is a side view of an optical connector main body in FIG. 33A.

In the example illustrated in FIGS. 33A and 33B, the fitting pin 15 is provided in the first region A1, and the protrusions 116a and 116a are provided in the both parts of the remaining region A4.

Figure 34A:
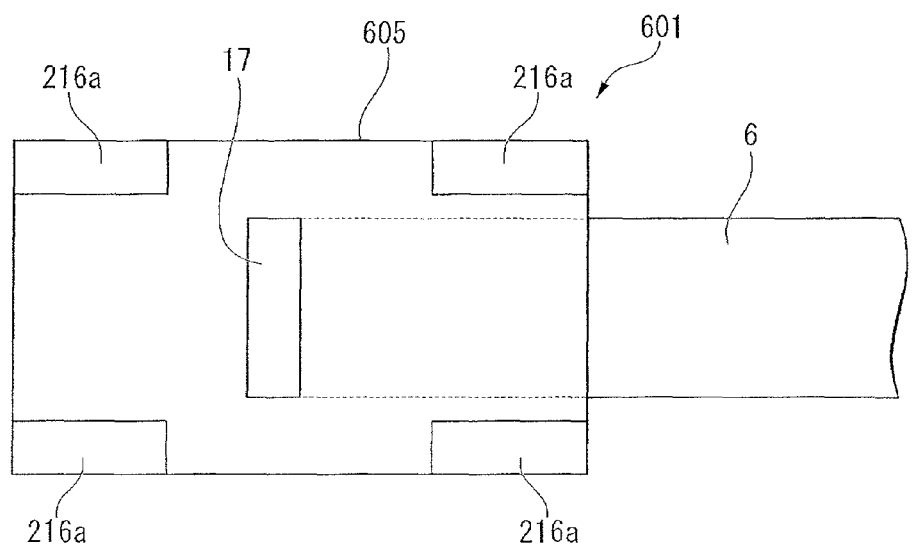
FIG. 34A is a plan view illustrating an arrangement of protruding portions or recessed portions in regions of an optical connection surface.
Figure 34B:
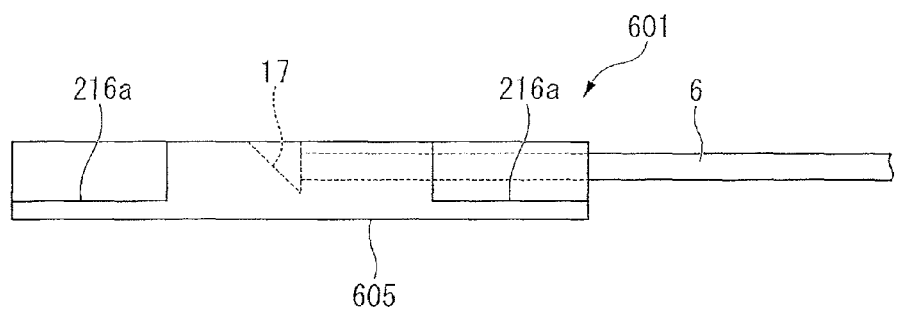
FIG. 34B is a side view of an optical connector main body in FIG. 34A.

In the example illustrated in FIGS. 34A and 34B, cut-off portions 216a and 216a are provided on both sides of the first region A1, and the cut-off portions 216a and 216a are provided in the both parts of the remaining region A4.

Figure 35A:
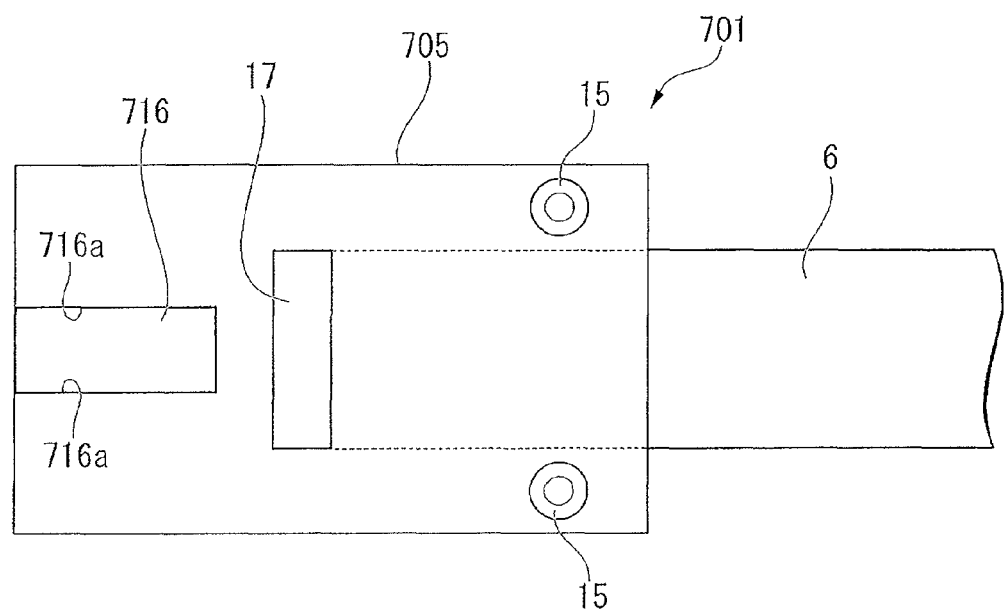
FIG. 35A is a plan view illustrating an arrangement of protruding portions or recessed portions in regions of an optical connection surface.
Figure 35B:
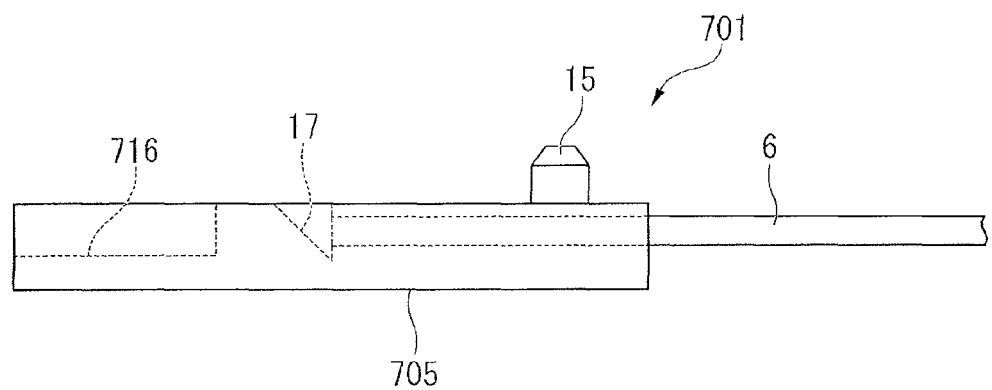
FIG. 35B is a side view of an optical connector main body in FIG. 35A.

In the example illustrated in FIGS. 35A and 35B, a rectangular recessed portion 716 (side surface fitting recessed portion) that is rectangular in the plan view is provided in the first region A1, and the fitting pins 15 are provided in the both parts of the remaining section A4.

The side surface 716a of the rectangular recessed portion 716 in the width direction is planar along the pitch direction (the left and right direction in FIG. 35A of the rectangular recessed portion 716 and the fitting pin 15.

As described above, as the recessed portion such as the circular pin hole 21 provided in an optical component, and a protruding or recessed portion that can be fitted to the protruding portion such as the protrusion 222a are provided in the first and remaining regions A1 and A4 in the optical connector main body, positioning between the optical connector and the optical component can be performed, thereby aligning optical paths of the optical connector and the optical component with each other.

In FIGS. 36A to 42B, an example in which one or more protruding portions or recessed portions are provided in the first regionA1 and one or more protruding portions are provided in the remaining region A4 is schematically illustrated. In addition, FIGS. 36A, 37A, 38A, 39A, 40A, 41A, and 42A are plan views of optical connectors 1, 801, 901, 1001, 201, 101, and 1101, and FIGS. 36B, 37B, 38B, 39B, 40B, 41B, and 42B are corresponding side views.

Figure 36A:
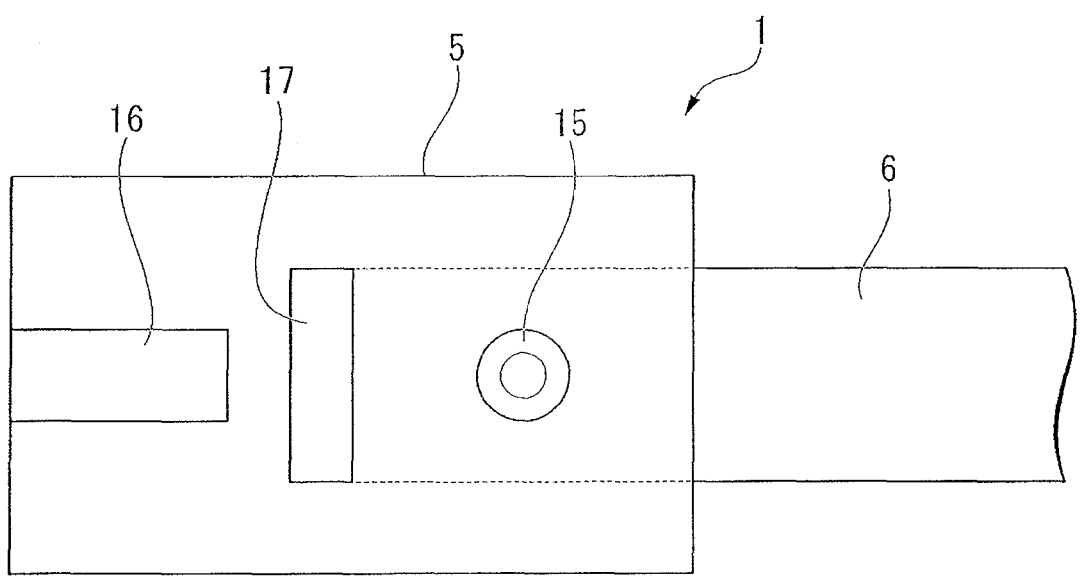
FIG. 36A is a plan view illustrating an arrangement of protruding portions or recessed portions in regions of an optical connection surface.
Figure 36B:
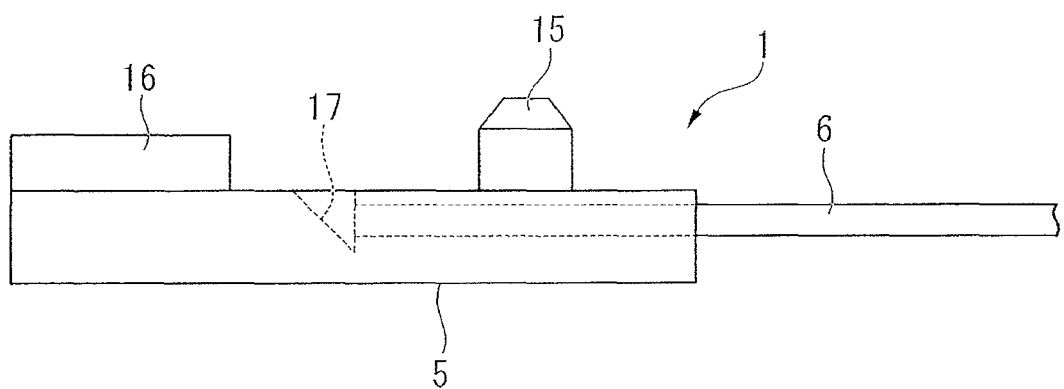
FIG. 36B is a side view of an optical connector main body in FIG. 36A.

Particularly, the optical connector 1 illustrated in FIGS. 36A and 36B has the same configuration as that of the optical connector described in Examples 1 to 3.

Figure 37A:
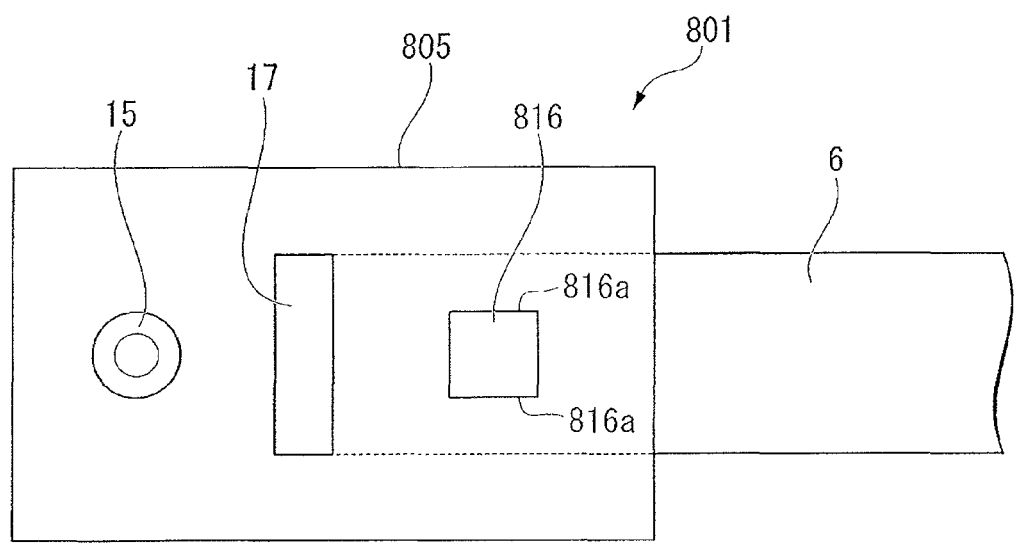
FIG. 37A is a plan view illustrating an arrangement of protruding portions or recessed portions in regions of an optical connection surface.
Figure 37B:
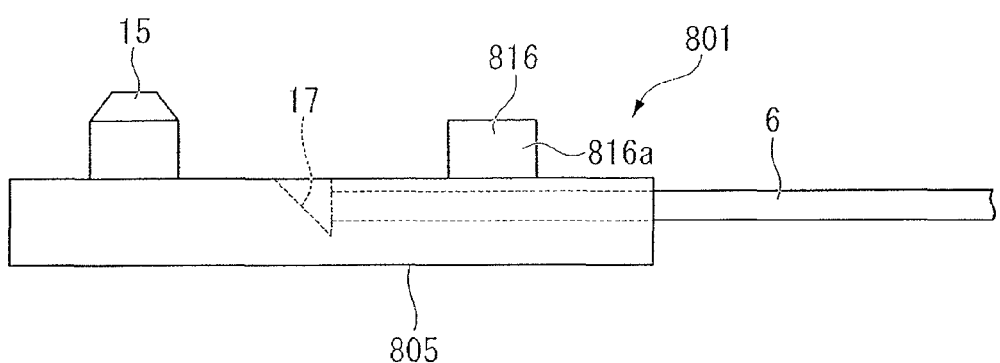
FIG. 37B is a side view of an optical connector main body in FIG. 37A.

In the optical connector 801 illustrated in FIGS. 37A and 37B, the fitting pin 15 is provided in the first region A1, and a rectangular projecting portion 816 (side surface fitting protruding portion) is provided in the hollow region A3. It is preferable that side surfaces 816a and 816a of the rectangular projecting portion 816 in the width direction be planar along a pitch direction of the fitting pin 15 and the rectangular projecting portion 816.

Figure 38A:
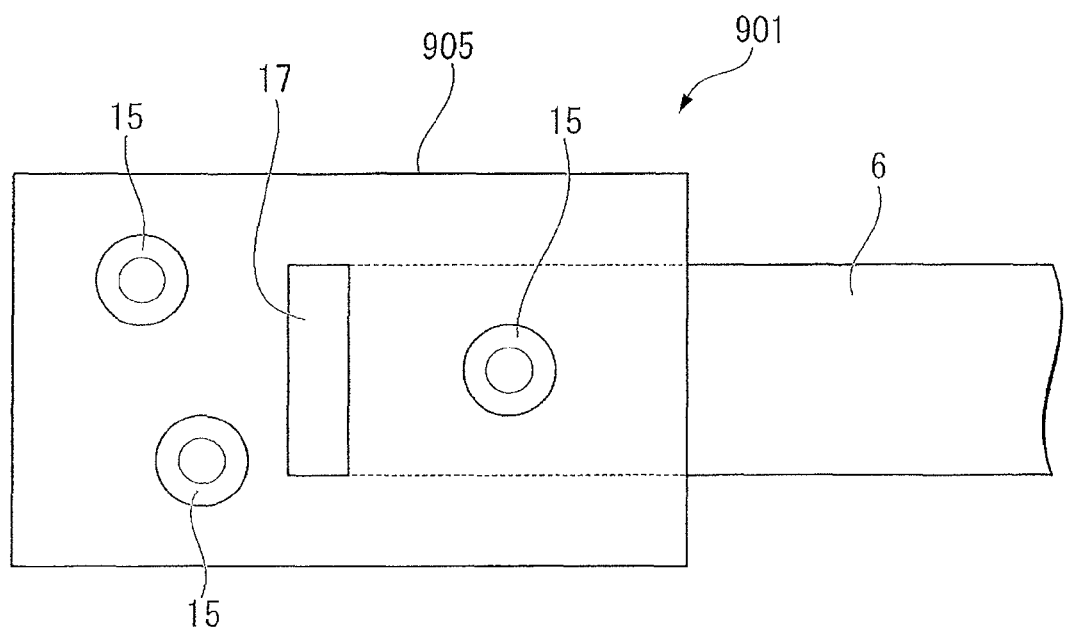
FIG. 38A is a plan view illustrating an arrangement of protruding portions or recessed portions in regions of an optical connection surface.
Figure 38B:
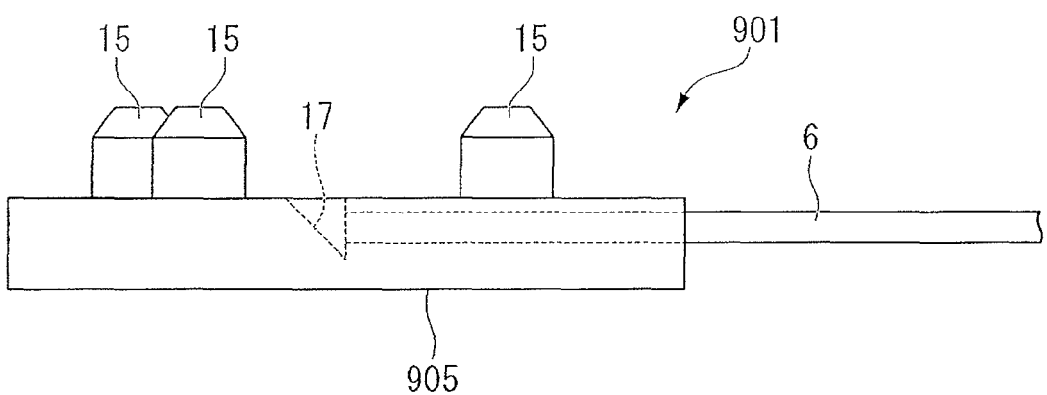
FIG. 38B is a side view of an optical connector main body in FIG. 38A.

In the optical connector 901 illustrated in FIGS. 38A and 38B, a plurality of (in the illustrated example, two) fitting pins 15 and 15 is provided in the first region A1, and the fitting pin 15 is also provided in the hollow region A3.

The two fitting pins 15 and 15 provided in the first region A1 are separated from each other in the width direction and placed at different positions in the forward and rearward direction.

Figure 39A:
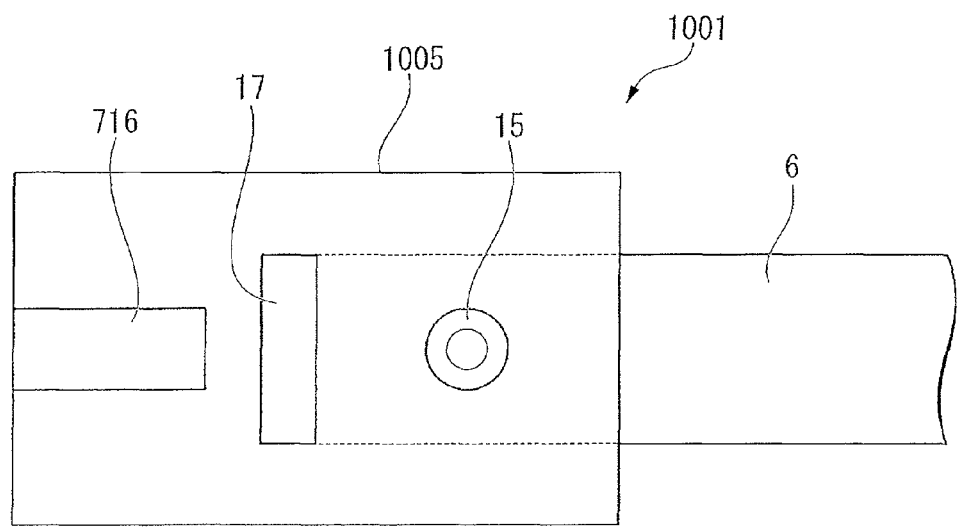
FIG. 39A is a plan view illustrating an arrangement of protruding portions or recessed portions in regions of an optical connection surface.
Figure 39B:
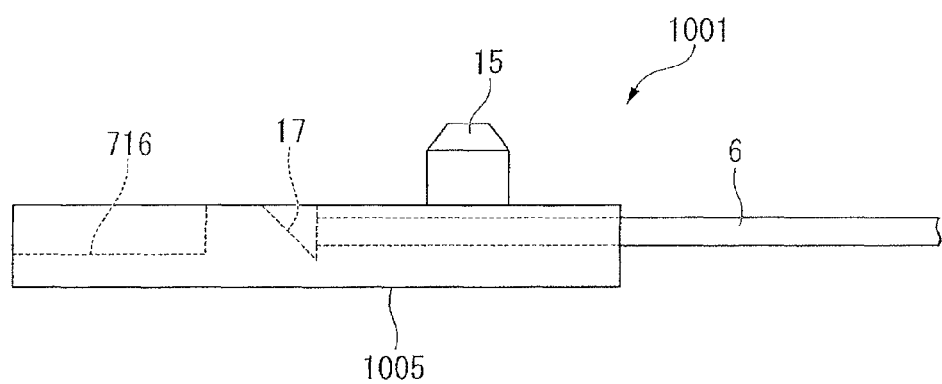
FIG. 39B is a side view of an optical connector main body in FIG. 39A.

In the optical connector 1001 illustrated in FIGS. 39A and 39B, a rectangular recessed portion 716 that is rectangular in the plan view is provided in the first region A1 (see FIGS. 35A and 35B), and the fitting pin 15 is provided in the hollow region A3.

Figure 40A:
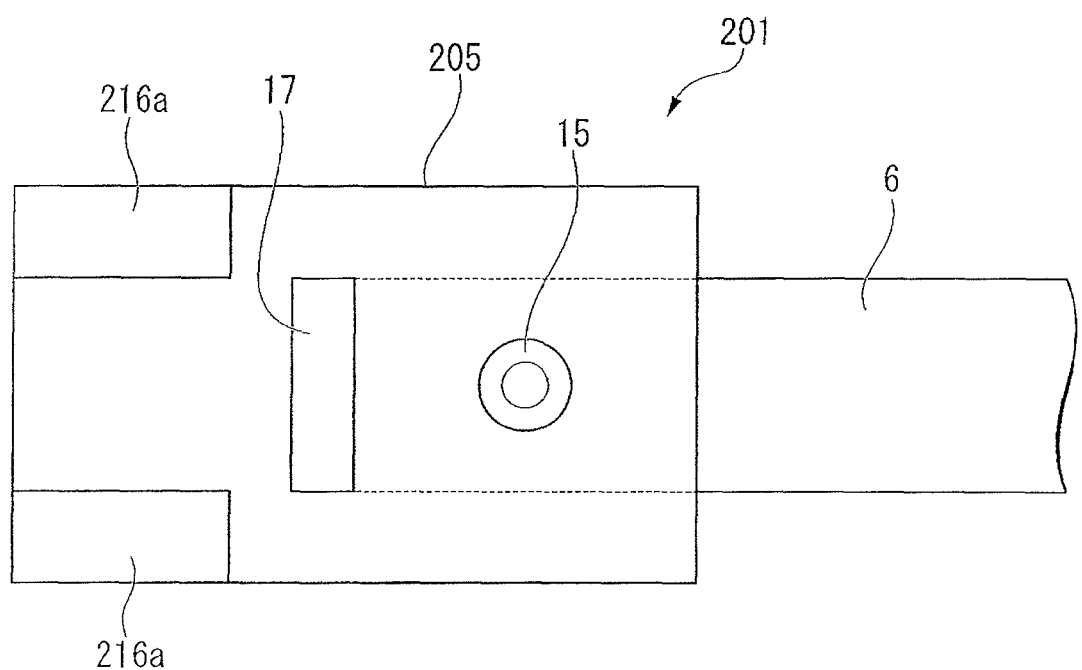
FIG. 40A is a plan view illustrating an arrangement of protruding portions or recessed portions in regions of an optical connection surface.
Figure 40B:
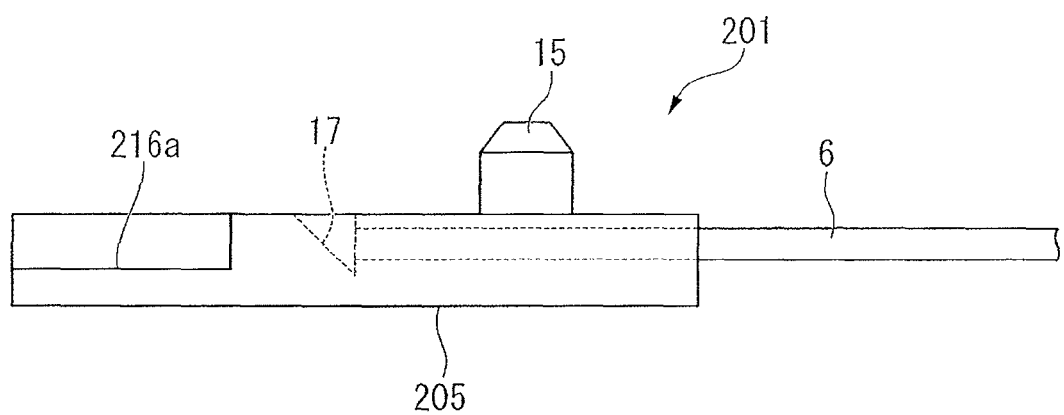
FIG. 40B is a side view of an optical connector main body in FIG. 40A.

The optical connector 201 illustrated in FIGS. 40A and 40B has the same configuration as that of the optical connector related to Examples 7 and 8.

Figure 41A:
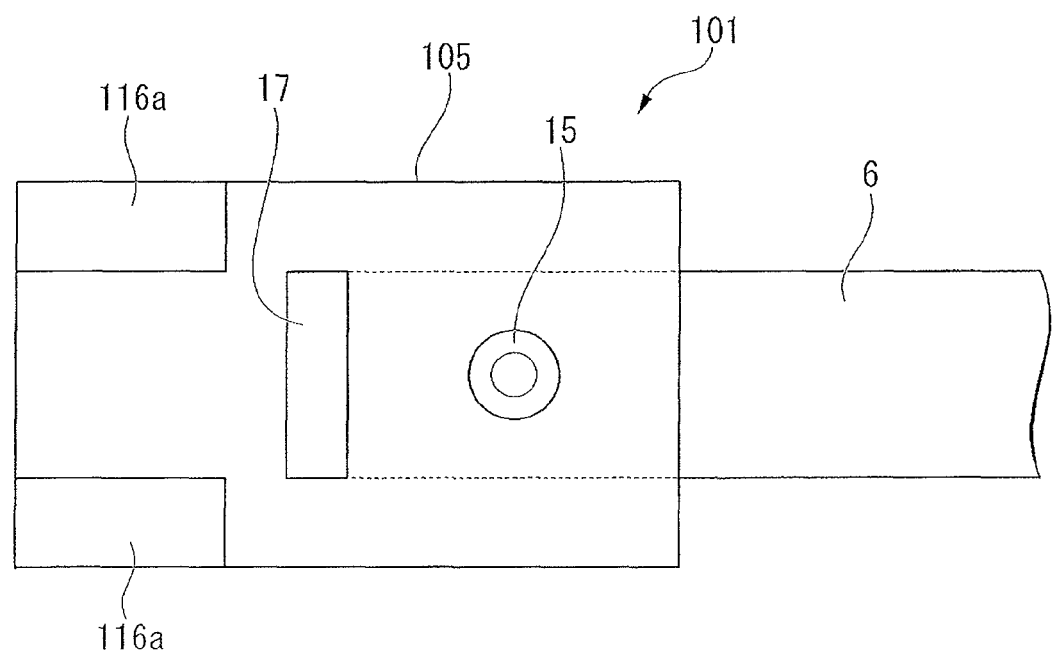
FIG. 41A is a plan view illustrating an arrangement of protruding portions or recessed portions in regions of an optical connection surface.
Figure 41B:
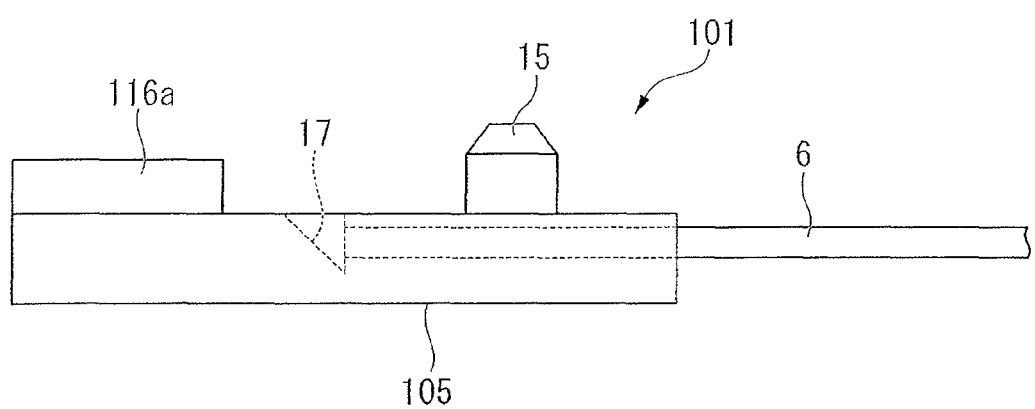
FIG. 41B is a side view of an optical connector main body in FIG. 41A.

The optical connector 101 illustrated in FIGS. 41A and 41B has the same configuration as that of the optical connector related to Examples 4 to 6.

Figure 42A:
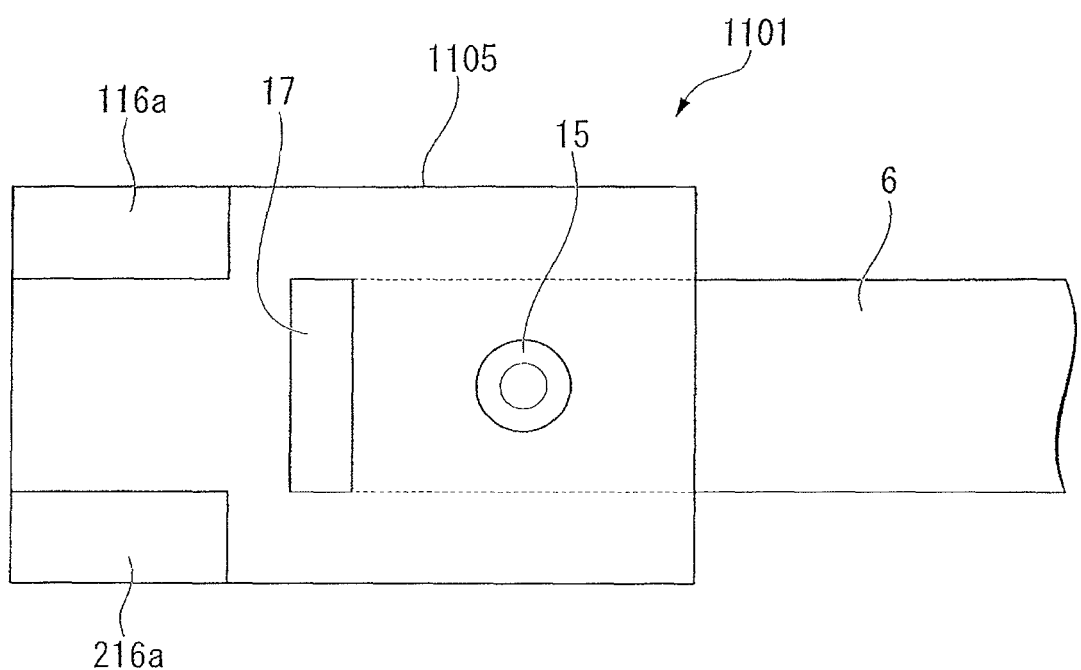
FIG. 42A is a plan view illustrating an arrangement of protruding portions or recessed portions in regions of an optical connection surface.
Figure 42B:
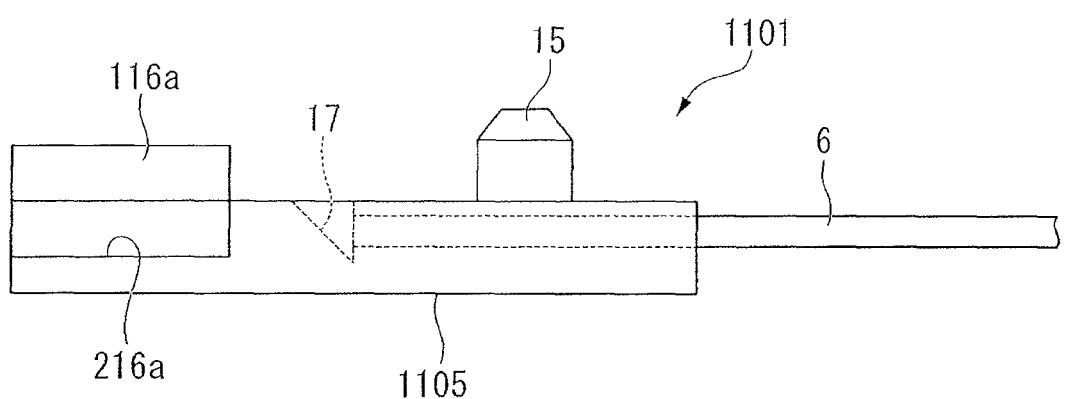
FIG. 42B is a side view of an optical connector main body in FIG. 42A.

In the optical connector 1101 illustrated in FIGS. 42A and 42B, the protrusion 116a is provided on one side of the first regionA1 and a cut-off portion 216a is provided on the other side thereof.

Arrangements and shapes of the fitting portions (protruding portions or recessed portions) are not limited by the illustrated examples. In addition, as illustrated in FIGS. 38A and 38B, two or more fitting portions may be provided in the same region, or the arrangement of the fitting portions in each region may be suitably changed.

For example, a recessed portion may be provided in stead of the fitting pin 15.

Furthermore, as illustrated in FIGS. 42A and 42B, both the protruding portion (protrusion 116a) and the recessed portion (cut-off portion 216a) may be provided in the same region.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical connector mounted on an optical component, the optical connector comprising:
   a connection end surface;
   a pair of fitting projecting portions which is provided on the connection end surface, and in which first fitting projection portion is a circular cross-sectional fitting pin and second fitting projection portion is a rectangular cross-sectional projecting portion; and
   an optical input and output portion which is provided on the connection end surface, and between the circular cross-sectional fitting pin and the rectangular cross-sectional projecting portion, the circular cross-sectional fitting pin and the rectangular cross-sectional projecting portion being arranged along and optical fiber introducing direction,
   the optical component comprising:
   a pair of fitting reception portions in which first fitting reception portion a circular hole to which the circular cross-sectional fitting pin is fitted and a rectangular cross-sectional groove to which the rectangular cross-sectional projecting portion is fitted;
   an optical element which is provided between the circular hole and the rectangular cross-sectional groove, the circular hole and the rectangular cross-sectional groove being arranged along the optical fiber introducing direction, wherein
   the optical connector is assembled to a front end of an optical fiber,
   the optical fiber having an optical axis direction different from that of the optical element,
   the optical connector converts an optical path from the optical fiber toward an optical element, and the optical connector is positioned to the optical element by the fitting projecting portions fitting to the fitting reception portions.

2. The optical connector according to claim 1, wherein
in the pair of fitting projecting portions, the circular cross-sectional fitting pin is disposed on a rearward side of the optical input and output portion along the optical fiber introducing direction, and
in the pair of fitting reception portions, the circular hole is disposed on the rearward side of the optical element along the optical fiber introducing direction.

3. The optical connector according to claim 2, the optical connector further comprising:
a reflective portion which is provided inside the optical connector, and converts an optical path in the inside of the optical connector toward the optical component.

4. The optical connector according to claim 1, the optical connector further comprising:
a reflective portion which is provided inside the optical connector, and converts an optical path in the inside of the optical connector toward the optical component.

5. An optical connector mounted on an optical component, the optical connector comprising:
a connection end surface;
a circular cross-sectional fitting pin which is provided on the connection end surface, and projects toward the optical component;
a U-shaped groove which is provided on the connection end surface, and which is a U-shape when seen from the direction perpendicular to a shaft center of the circular cross-sectional fitting pin; and
an optical input and output portion which is provided on the connection end surface, and between the circular cross-sectional fitting pin and the U-shaped groove, the circular cross-sectional fitting pin and the U-shaped groove being arranged along an optical fiber introducing direction,
the optical component comprising:
a circular hole;
at least one rectangular cross-sectional protruding portion;
an optical element which is provided between the circular hole and the rectangular cross-sectional protruding portion, the circular hole and the rectangular cross-sectional protruding portion being arranged along an optical fiber introducing direction, wherein
optical paths of the optical connector and the optical component is aligned by connecting the optical connector to the optical component, and
the optical connector is positioned to the optical element by the circular cross-sectional fitting pin fitting to the circular hole and the U-shaped groove fitting to the rectangular cross-sectional protruding portion.

6. The optical connector according to claim 5, wherein,
the optical connector is a first optical connector, and the optical component is a second optical connector.

7. An optical connector mounted on an substrate, the optical connector comprising:
a circular cross-sectional fitting pin which is provided on the surface opposed to a substrate, and projects toward the substrate;
a U-shaped groove which is provided on the surface opposed to the substrate, and which is a U-shape when seen from the direction perpendicular to a shaft center of the circular cross-sectional fitting pin; and
an optical input and output portion which is provided on the surface opposed to the substrate, and between the circular cross-sectional fitting pin and the U-shaped groove, the circular cross-sectional fitting pin and the U-shaped groove being arranged along an optical fiber introducing direction,
the substrate comprising:
a circular hole;
at least one rectangular cross-sectional protruding portion;
at least one optical element which is provided between the circular hole and the rectangular cross-sectional protruding portion, the circular hole and the rectangular cross-sectional protruding portion being arranged along an optical fiber introducing direction, wherein
optical paths of the optical connector and the optical element is aligned by connecting the optical connector to the substrate, and
the optical connector is positioned to the optical element by the circular cross-sectional fitting pin fitting to the circular hole and the U-shaped groove fitting to the rectangular cross-sectional protruding portion,
the optical connector is assembled to a front end of an optical fiber, the optical fiber having an optical axis direction different from that of the optical element, and
the optical connector coverts an optical path from the optical fiber toward an optical element.

8. The optical connector according to claim 7, the optical connector further comprising:
a reflective portion which is provided inside the optical connector, and converts an optical path in the inside of the optical connector toward the substrate.

9. An optical connector mounted on an optical component, the optical connector comprising:
a first connection surface;
a circular cross-sectional fitting pin which is provided on the first connection surface, and projects toward the optical component;
a protruding portion which is formed between both end sides of cut-off portions, the cut-off portions being descend from the first connection surface and provided on both end of the first connection surface in a width direction; and
an optical input and output portion which is provided on the first connection surface, and between the circular cross-sectional fitting pin and protruding portion, the circular cross-sectional fitting pin and the rectangular cross-sectional projection portion being arranged along an optical fiber introducing direction,
the optical component comprising:
a second connection surface;
a circular hole which is provided on the second connection surface, and to which the circular cross-sectional fitting pin is fitted;
a groove portion which is formed between two projection portions fitted to each the cut-off portions;
an optical element, wherein
the circular hole and the groove portion are provided on both sides interposing the optical input and output portion therebetween on the second connection surface, the circular hole and the groove portion being arranged along an optical fiber introducing direction,
the optical connector is positioned to the optical element by the circular cross-sectional fitting pin fitting to a circular hole and the protruding portion fitting to the groove portion,
the optical connector is assembled to a front end of an optical fiber, the optical fiber having an optical axis direction different from that of the optical element, and
the optical connector converts an optical path from the optical fiber toward an optical element.

* * * * *